(12) United States Patent
Aoki

(10) Patent No.: US 9,236,590 B2
(45) Date of Patent: Jan. 12, 2016

(54) ELECTRIC STORAGE MODULE AND ELECTRIC STORAGE DEVICE

(75) Inventor: Sadayuki Aoki, Takahagi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 1160 days.

(21) Appl. No.: 13/189,616

(22) Filed: Jul. 25, 2011

(65) Prior Publication Data

US 2012/0028099 A1    Feb. 2, 2012

(30) Foreign Application Priority Data

Jul. 29, 2010    (JP) ................. 2010-170029

(51) Int. Cl.

| H01M 10/65 | (2014.01) |
|---|---|
| H01M 2/10 | (2006.01) |
| H01M 10/625 | (2014.01) |
| H01M 10/647 | (2014.01) |
| H01M 10/6557 | (2014.01) |
| H01M 10/6555 | (2014.01) |
| H01M 10/643 | (2014.01) |
| H01M 10/651 | (2014.01) |
| H01M 10/613 | (2014.01) |

(Continued)

(52) U.S. Cl.
CPC .......... *H01M 2/1077* (2013.01); *H01M 10/613* (2015.04); *H01M 10/625* (2015.04); *H01M 10/643* (2015.04); *H01M 10/647* (2015.04); *H01M 10/651* (2015.04); *H01M 10/6555* (2015.04); *H01M 10/6557* (2015.04); *H01M 10/653* (2015.04); *H01M 10/6563* (2015.04); *H01M 10/6564* (2015.04); *H01M 10/6567* (2015.04)

(58) Field of Classification Search
USPC .......................................................... 429/120
See application file for complete search history.

(56) References Cited

U.S. PATENT DOCUMENTS

| 5,756,227 A | 5/1998 | Suzuki et al. |
|---|---|---|
| 2006/0056142 A1 | 3/2006 | Takahashi et al. |

(Continued)

FOREIGN PATENT DOCUMENTS

| CN | 101606210 A | 12/2009 |
|---|---|---|
| CN | 102163734 A | 8/2011 |

(Continued)

OTHER PUBLICATIONS

European Search Report dated Dec. 7, 2011, (six (6) pages).

(Continued)

*Primary Examiner* — Ula C Ruddock
*Assistant Examiner* — Frank Chernow
(74) *Attorney, Agent, or Firm* — Crowell & Moring LLP

(57) ABSTRACT

An electric storage module includes: a cooling plate with a predetermined thickness between a front surface and a rear surface, with the front surface and the rear surface functioning as cooling surfaces by a coolant flowing in the cooling plate; a first battery row made up with a plurality of battery cells, to be cooled by the cooling plate, arrayed along a predetermined direction, with one end surfaces of the battery cells being coupled with the front surface of the cooling plate so as to achieve thermal conduction; and a second battery row made up with a plurality of battery cells, to be cooled by the cooling plate, arrayed along a predetermined direction, with one end surfaces of the battery cells being coupled with the rear surface of the cooling plate so as to achieve thermal conduction.

10 Claims, 29 Drawing Sheets

(51) Int. Cl.
*H01M 10/653* (2014.01)
*H01M 10/6563* (2014.01)
*H01M 10/6567* (2014.01)
*H01M 10/6564* (2014.01)

(56) References Cited

U.S. PATENT DOCUMENTS

| | | |
|---|---|---|
| 2009/0111009 A1 | 4/2009 | Goesmann et al. |
| 2009/0142653 A1 | 6/2009 | Okada et al. |
| 2009/0214940 A1* | 8/2009 | Haussmann .................. 429/120 |
| 2010/0015512 A1 | 1/2010 | Inoue et al. |
| 2011/0045334 A1 | 2/2011 | Meintschel et al. |
| 2011/0200862 A1 | 8/2011 | Kurosawa |

FOREIGN PATENT DOCUMENTS

| | | |
|---|---|---|
| DE | 20 2007 017 390 U1 | 5/2009 |
| DE | 10 2007 063 195 A1 | 6/2009 |
| EP | 2 357 689 A1 | 8/2011 |
| JP | 2006-79751 A | 3/2006 |
| JP | 2007-95483 A | 4/2007 |
| JP | 2008-59950 A | 3/2008 |
| JP | 2008-181734 A | 8/2008 |
| JP | 2008-270459 A | 11/2008 |
| JP | 2009-99445 A | 5/2009 |
| JP | 2009-238654 A | 10/2009 |
| JP | 2009-301835 A | 12/2009 |
| JP | 2009-301853 A | 12/2009 |
| JP | 2010-62130 A | 3/2010 |
| JP | 2010-105640 A | 5/2010 |

OTHER PUBLICATIONS

Chinese Office Action with English Translation dated Aug. 20, 2013 (twenty-eight (28) pages).
Japanese Office Action with English Translation dated Nov. 20, 2012 (ten (10) pages).
European Search Report dated Dec. 15, 2011, (six (6) pages).

* cited by examiner

ELECTRIC STORAGE MODULE AND ELECTRIC STORAGE DEVICE

INCORPORATION BY REFERENCE

The disclosure of the following priority application is herein incorporated by reference: Japanese Patent Application No. 2010-170029 filed Jul. 29, 2010

BACKGROUND OF THE INVENTION

1. Field of the Invention

The present invention relates to an electric storage module and an electric storage device equipped with a plurality of battery cells and capable of discharging and accumulating electrical energy.

2. Description of Related Art

An electric storage module installed as a power source in a hybrid vehicle, an electric vehicle or the like is configured by combining numerous secondary battery cells, such as lithium ion battery cells, nickel-metal-hydride battery cells or nickel cadmium battery cells. Since a very large charging/discharging current flows through the electric storage module, the temperature of the battery cells tends to rise significantly. An increase in the temperature at the battery cells lowers the battery cell performance and reduces the service life of the battery cells. For this reason, the battery cells need to be cooled promptly.

The battery cells may be quickly cooled by using a coolant such as water or refrigerant gas. Japanese Laid Open Patent Publication No. 2010-62130 discloses a method in which a plurality of battery cells connected with each other and arrayed via an insulating sheet so as to be coolable on one surface of a cooling plate in which a coolant flow passage is formed, are cooled with a coolant supplied to the cooling plate.

SUMMARY OF THE INVENTION

The electric storage module disclosed in the above publication includes a plurality of battery cells connected to one another so as to achieve thermal conduction, are disposed only on one surface of the cooling plate. This means that a high level of volumetric efficiency for cooling cannot be achieved and also, the overall size of the battery module is bound to become large.

An electric storage module according to a first aspect of the present invention comprises: a cooling plate with a predetermined thickness between a front surface and a rear surface, with the front surface and the rear surface functioning as cooling surfaces by a coolant flowing in the cooling plate; a first battery row made up with a plurality of battery cells, to be cooled by the cooling plate, arrayed along a predetermined direction, with one end surfaces of the battery cells being coupled with the front surface of the cooling plate so as to achieve thermal conduction; and a second battery row made up with a plurality of battery cells, to be cooled by the cooling plate, arrayed along a predetermined direction, with one end surfaces of the battery cells being coupled with the rear surface of the cooling plate so as to achieve thermal conduction.

According to a second aspect of the present invention, the electric storage module according to the first aspect may further comprise: cell separator plates disposed along the predetermined direction, wherein: the first battery row is disposed over a plurality of stages stacked along a direction perpendicular to the predetermined direction with a cell separator plate inserted between the stages and the second battery row is disposed over a plurality of stages stacked along the direction perpendicular to the predetermined direction with a cell separator plate inserted between the stages.

According to a third aspect of the present invention, the electric storage module according to the first aspect may further comprise: a first terminal cover and a second terminal cover disposed so as to hold the first battery row and the second battery row in place respectively between the cooling plate and the first terminal cover and between the cooling plate and the second terminal cover; and a locking device that holds the first battery row and the second battery row pressed toward the cooling plate respectively with the first terminal cover and the second terminal cover.

According to a fourth aspect of the present invention, in the electric storage module according to the third aspect, the locking device may include a pair of end plates, one disposed along one side of the first battery row and the second battery row, and another disposed along another side of the first battery row and the second battery row, and elastic members disposed so as to apply a force to the first and second terminal covers toward the end plates.

According to a fifth aspect of the present invention, in the electric storage module according to the first aspect, it is preferable that the battery cells in the first battery row and the second battery row are flat prismatic secondary battery cells; and the one end surfaces of the battery cells thermally coupled with the front surface and the rear surface of the cooling plate are battery case bottom surfaces located on a side opposite from surfaces where positive electrode terminals and negative electrode terminals of the battery cells are located.

According to a sixth aspect of the present invention, in the electric storage module according to the first aspect, it is preferable that the battery cells in the first battery row and the second battery row are cylindrical secondary battery cells; and the one end surfaces of the battery cells thermally coupled with the front surface and the rear surface of the cooling plate are each a positive electrode terminal surface or a negative electrode terminal surface of a battery cell, with the positive electrode terminal surface and the negative electrode terminal surface alternately facing toward the cooling plate along the predetermined direction along which the battery cells are arrayed.

According to a seventh aspect of the present invention, in the electric storage module according to the first aspect, a heat transfer member with a coefficient of thermal conductivity equal to or higher than 1 W/m·K may be disposed between the front surface of the cooling plate and the one end surfaces of the battery cells and between the rear surface of the cooling plate and the one end surfaces of the battery cells.

According to a eighth aspect of the present invention, in the electric storage module according to the seventh aspect, the heat transfer member may be constituted with one of a thermally conductive sheet, a thermally conductive gel and a thermally conductive adhesive.

According to a ninth aspect of the present invention, in the electric storage module according to the seventh aspect, it is preferable that insulating members with a predetermined thickness are disposed at the cooling plate so as to hold corners of the battery cells; and the heat transfer member, compressed to a thickness corresponding to the thickness of the insulating members, is in contact with the front surface of the cooling plate and the one end surfaces of the battery cells and with the rear surface of the cooling plate and the one end surfaces of the battery cells.

According to a tenth aspect of the present invention, in the electric storage module according to the seventh aspect, it is preferable that a recessed portion with a width smaller than a width of the one end surfaces of the battery cells is formed at both the front surface and the rear surface of the cooling plate; and the heat transfer member, placed within the recessed portion and compressed along a thickness-wise direction, is in contact with the front surface of the cooling plate and the one end surfaces of the battery cells and with the rear surface of the cooling plate and the one end surfaces of the battery cells.

According to a eleventh aspect of the present invention, in the electric storage module according to the first aspect, a plurality of grooves corresponding to the one end surfaces of the battery cells may be formed both at the front surface and at the rear surface of the cooling plate.

According to a twelfth aspect of the present invention, in the electric storage module according to the first aspect, the cooling plate may include a coolant passage through which a coolant flows along the predetermined direction running from an intake side toward an outlet side, with the coolant passage including a serpentine path.

According to a thirteenth aspect of the present invention, in the electric storage module according to the first to eleventh aspects, the cooling plate may include a plurality of coolant passages formed between an intake side and an outlet side.

According to a fourteenth aspect of the present invention, in the electric storage module according to the first aspect, the cooling plate may include a cooling block formed by using one of an aluminum metal, magnesium and an insulating material achieving a coefficient of thermal conductivity equal to or higher than 1 W/m·K.

According to a fifteenth aspect of the present invention, in the electric storage module according to the first aspect, the cooling plate may include a pipe formed by using one of an aluminum metal, copper, iron, stainless steel, and an insulating material achieving a coefficient of thermal conductivity equal to or higher than 1 W/m·K.

An electric storage device according to a sixteenth aspect of the present invention comprises: a plurality of the electric storage modules according to the first aspect, wherein cooling plates of the electric storage modules are connected to one another so as to achieve a branched flow of coolant.

DESCRIPTION OF PREFERRED EMBODIMENTS

—Embodiment 1—

The following is a description of an electric storage module and an electric storage device according to embodiment 1 of the present invention, given in reference to drawings.

(Electric Storage Module)

Figure 1:
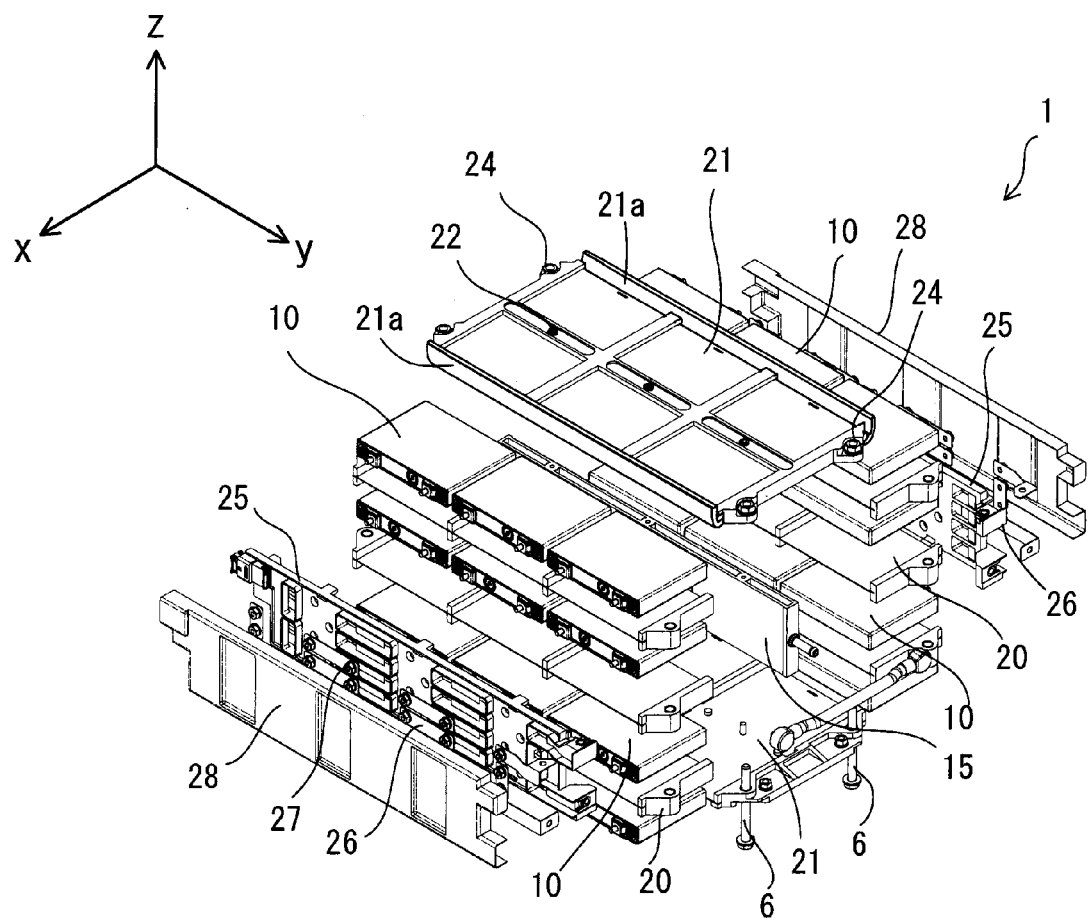
FIG. 1 shows an exploded perspective of an electric storage module according to embodiment 1 of the present invention.
Figure 2:
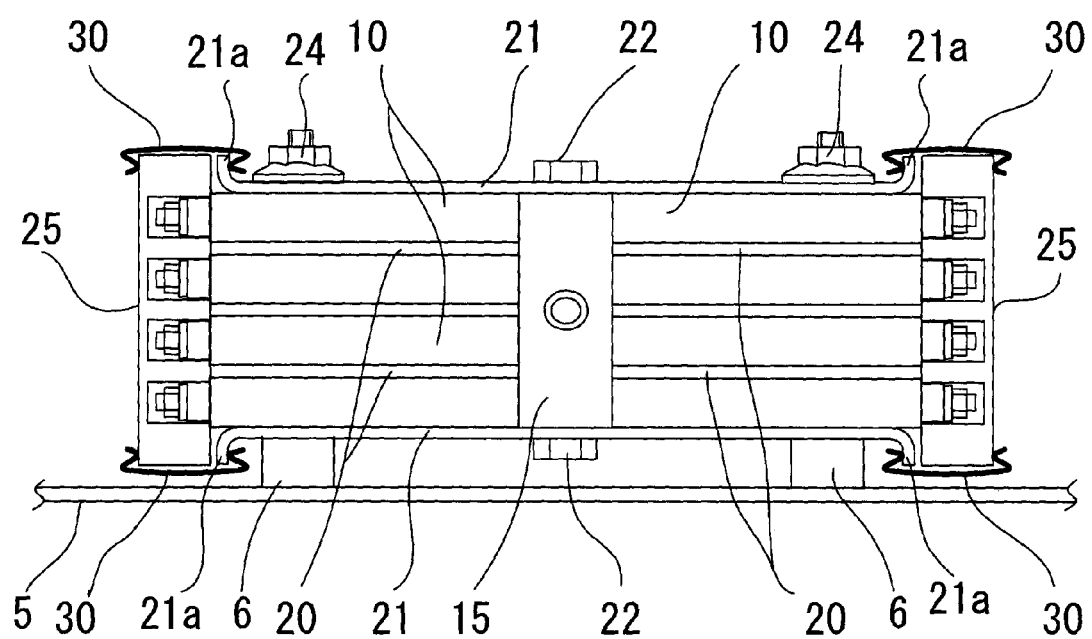
FIG. 2 is a front view taken from the front side of the electric storage module shown in FIG. 1.

FIG. 1 is an exploded perspective of an electric storage module (or storage battery module) 1 according to the present invention, and FIG. 2 is a front view of the electric storage module in FIG. 1 taken from the front side of the battery module. FIG. 2 does not include an illustration of a cover 28, which is to be described in detail later.

The electric storage module 1 includes numerous battery cells 10. As indicated in FIG. 1, the direction extending along the depth of the electric storage module, the direction extending along the length of the electric storage module and the direction extending along the height of the electric storage module are respectively defined as an x direction, a y direction and a z direction. At a substantial center of the electric storage module 1 along the x (depth) direction, a cooling plate 15 is disposed. The cooling plate 15 assumes the shape of a flat plate. The sides of the front facing surface of the cooling plate extending along the z (height) direction, achieve a greater dimension than the sides extending along the x (depth) direction and the side surfaces of the cooling plate are elongated along the y (length) direction. As shown in the figure, 3 (along the y (length) direction)×4 (along the z (height) direction) battery cells 10, i.e., a four-stage stack of battery cells, with three battery cells disposed at each stage, is disposed along one surface (front surface) and along another surface (rear surface) located on the other side of the one surface along the thickness of the cooling plate. However, this is simply an example and the quantity of battery cells 10 can be adjusted as needed.

Cell separator plates 20 are inserted between adjoining stages of battery cells 10. An end plate 21 is disposed over the battery cells 10 at the uppermost stage so as to cover all the uppermost-stage battery cells 10 disposed on an x-y plane. An end plate 21 is disposed under the battery cells 10 at the lowermost stage so as to cover all the lowermost-stage battery cells 10 disposed on an x-y plane. The end plates 21 each include bent portions 21a, each formed by bending along the z (height) direction one of the two sides ranging along the y (length) direction.

Terminal covers 25 are disposed, one on an outer side of battery cells 10 and another on an outer side of the other battery cells 10 with the two outer sides facing each other along the x (depth) direction, so as to cover the side surfaces (y-z surfaces) of all the battery cells 10 on the outer sides. Further outward relative to each terminal cover 25 along the x direction, a cover 28 is disposed.

Figure 6:
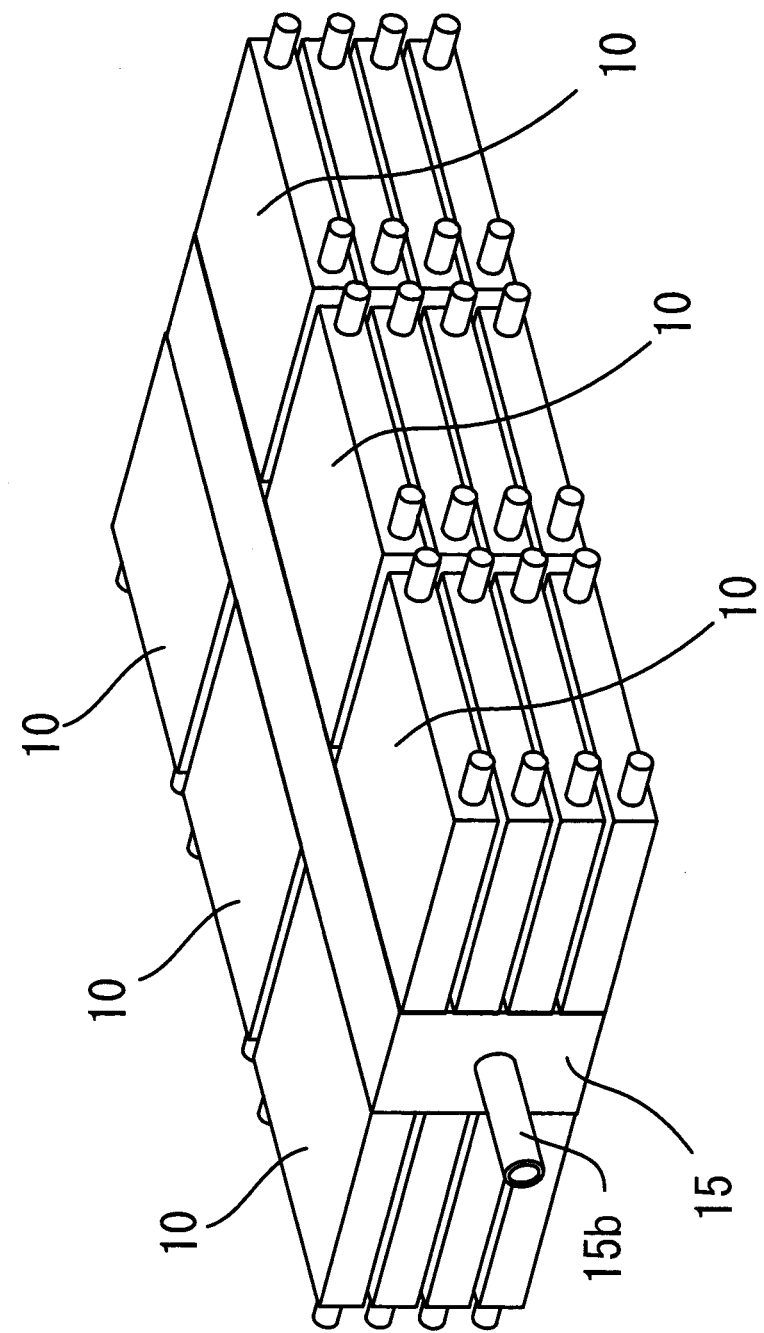
FIG. 6 shows a perspective in reference to which the cooling structure adopted in the electric storage module in FIG. 1 is to be described.
Figure 7:
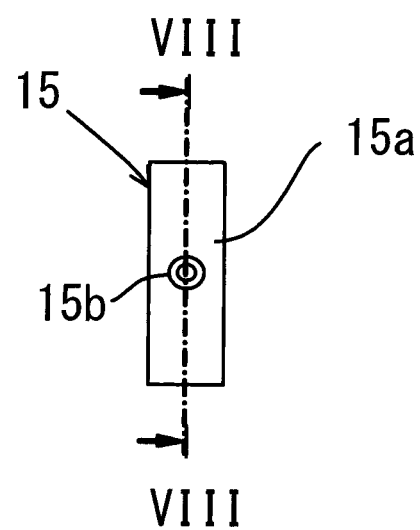
FIG. 7 shows a front view of the cooling plate which is a part of the electric storage module shown in FIG. 1.
Figure 8:
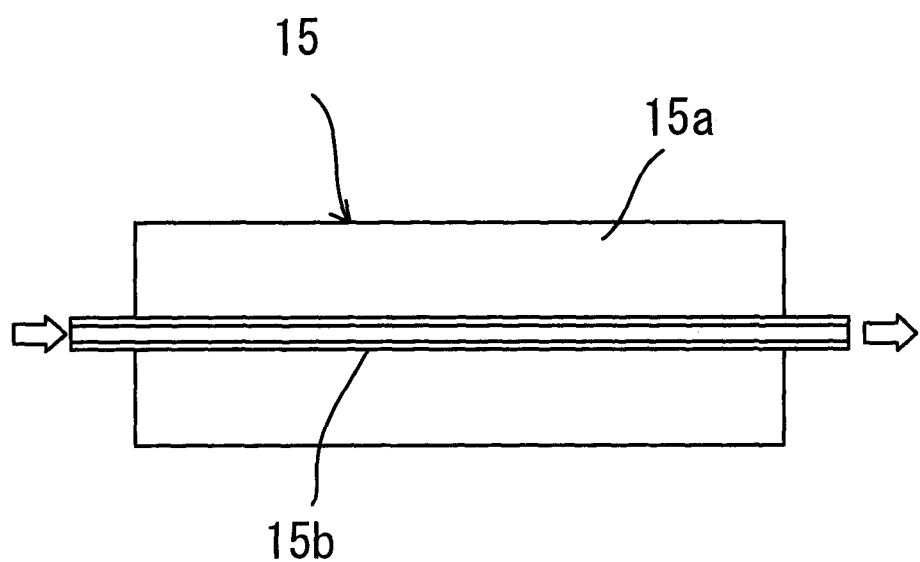
FIG. 8 shows a sectional view taken along line VIII-VIII in FIG. 7.

FIG. 6 is a perspective showing the connecting structure with which the cooling plate 15 and the battery cells 10 are connected so as to achieve thermal conduction, FIG. 7 is a front view taken from the front side of the cooling plate 15, and FIG. 8 is a sectional view taken along line VIII-VIII in FIG. 7.

The cooling plate 15 is constituted with a cooling block 15a and a pipe 15b. The cooling block 15a may be formed by using a metal such as die-cast aluminum, aluminum or magnesium, or by using an insulating resin with a coefficient of thermal conductivity equal to or higher than 1 W/m·K. The pipe 15b, with a through hole through which the coolant flows formed therein, may be formed by using a metal such as aluminum, copper, iron or stainless steel, or by using an insulating resin with a coefficient of thermal conductivity equal to or higher than 1 W/m·K.

The pipe 15b may be fixed onto the cooling block 15a so as to form the cooling plate 15 by, for instance, casting or molding the cooling block 15a onto the pipe 15b. As an alternative, the pipe 15b may be fixed through press-fitting or bonding at an opening of a cooling block 15a formed in advance so as to include the opening assuming dimensions that will allow the pipe 15b to be inserted through. As a further alternative, the cooling block 15a and the pipe 15b may be molded as an integrated unit.

Figure 11:
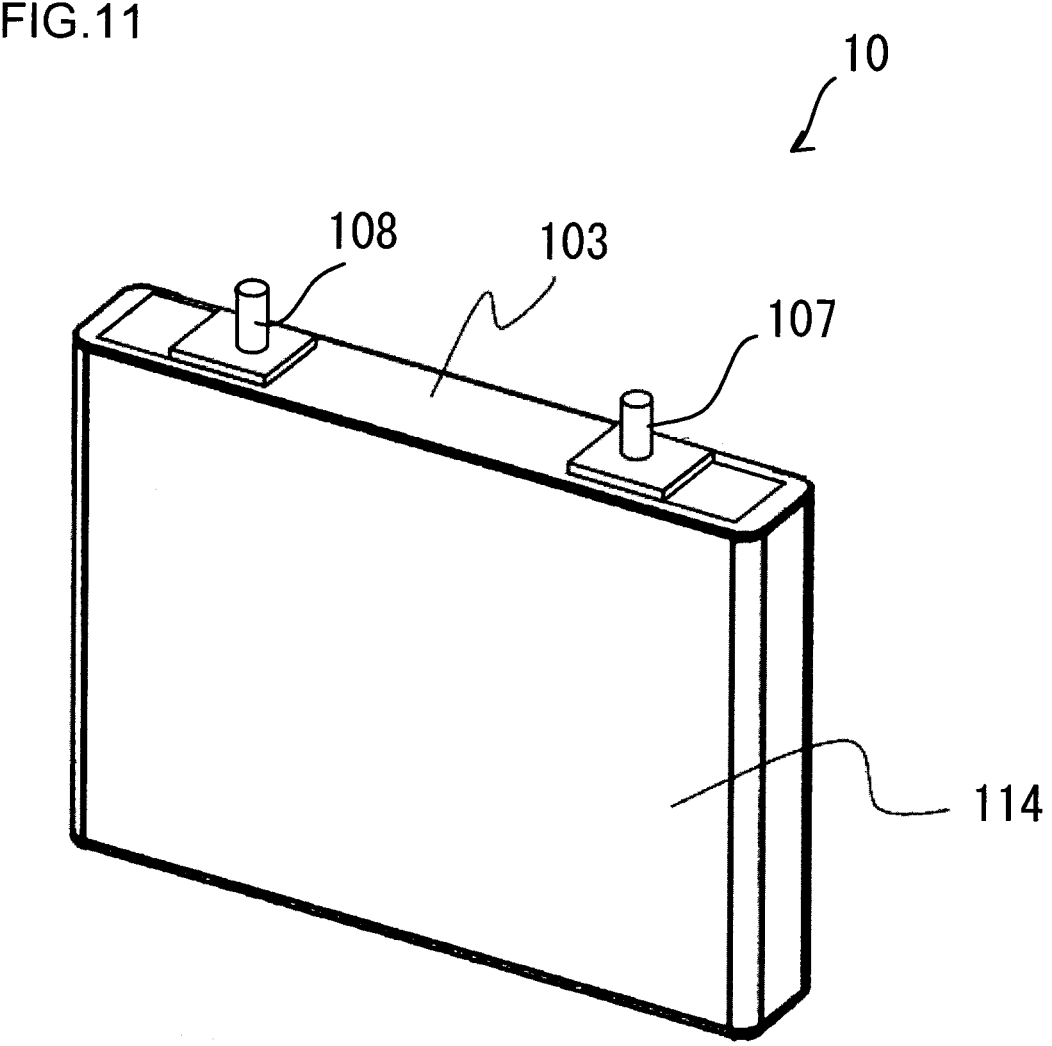
FIG. 11 shows a perspective providing an external view of an example of a battery cell that may be used in the electric storage module according to the present invention.
Figure 12:
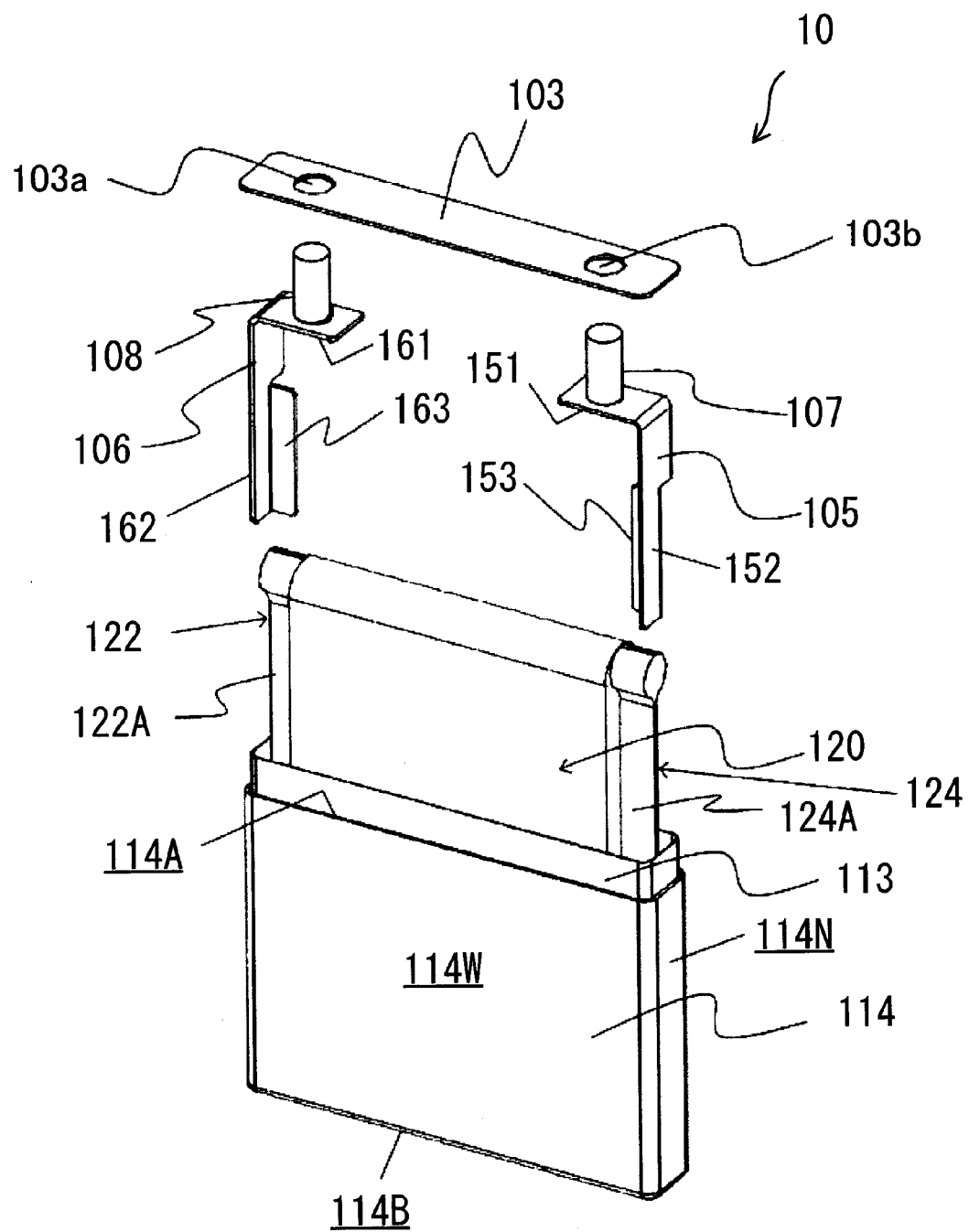
FIG. 12 shows an exploded perspective of the battery cell in FIG. 11.

The battery cells 10 may be, for instance, prismatic lithium ion secondary battery cells. FIG. 11 is a perspective providing an external view of a battery cell 10, FIG. 12 is an exploded perspective of the battery cell 10 in FIG. 11, and FIG. 13 is a perspective of a flat power generating element assembly 120, which constitutes the battery cell 10.

The battery cell 10 assumes a sealed structure achieved by housing, via an insulating case 113, a winding-type power generating element assembly 120 into a rectangular parallelepiped battery case 114 with an opening located at one face thereof and sealing off an opening 114A at the battery case 114 with a battery lid 103. A battery cell container casing is formed with the battery case 114 and the battery lid 103. A positive electrode output portion 108 and a negative electrode output portion 107, ranging from the inside of the battery case project out through the battery lid 103. The positive and negative electrode output portions 108 and 107 function as positive and negative electrode external terminals located at the surface of the battery cell container casing. The positive and negative electrode external terminals 108 and 107, through which electric power generated through the winding-type power generating element assembly 120 is output to the outside and electric power generated outside the battery cell is provided to charge the winding-type power generating element assembly 120, are respectively formed as integrated parts of a positive electrode current collector 106 and a negative electrode current collector 105 which are to be described in detail later.

The battery case 114, constituted of a metal, is formed through deep-drawing so that a greater dimension is achieved along the depthwise direction over the dimension along the shorter sides of its opening. The battery case 114 is a flat, rectangular parallelepiped with a solid bottom, which is made up with wide side surfaces 114W ranging over a large area, narrow side surfaces 114N ranging over a small area and a bottom surface (case bottom surface) 114B located at the bottom of the container. The opening 114A is formed at the upper side of the battery case. The battery lid 103 is fixed at the opening 114A of the battery case 114 through laser welding. Openings 103a and 103b, through which the positive electrode output portion 108 and the negative electrode output portion 107 located at two ends are to be respectively inserted, are formed at the battery lid 103. In addition, an electrolyte filling port (not shown) located at the battery lid 103 is sealed through laser welding once the battery case 114 has been filled with electrolyte through the electrolyte filling port.

Figure 13:
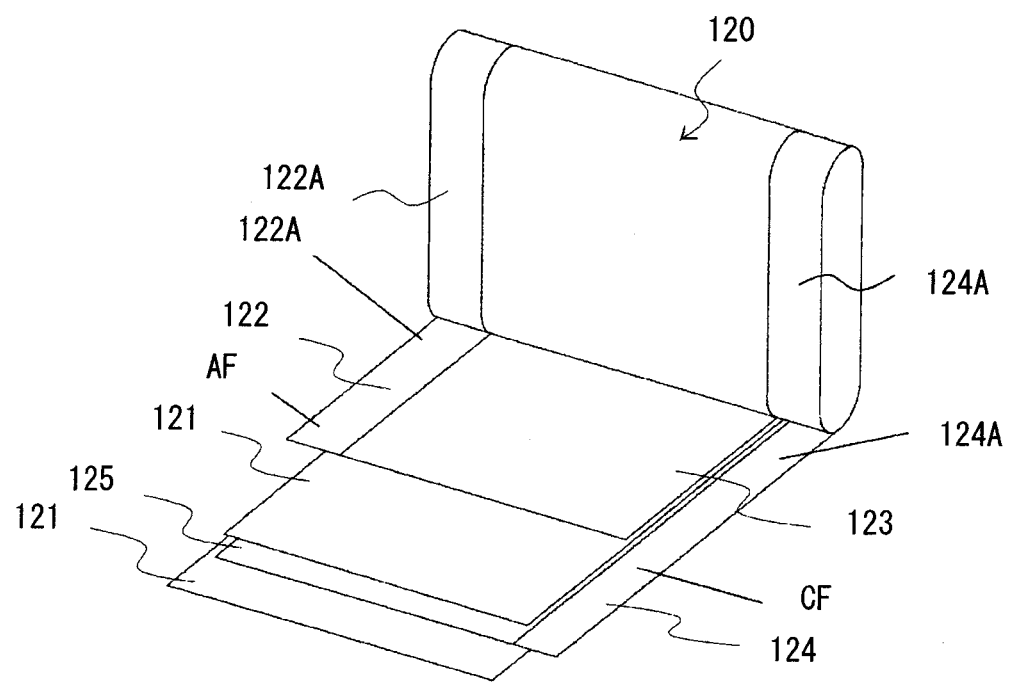
FIG. 13 shows a perspective of a set of power generating elements included in the battery cell shown in FIG. 12.

As shown in FIG. 13, the winding-type power generating element assembly 120 is a unit formed to achieve an elliptical section by winding, via separators 121, a positive plate 122 made up with a positive foil AF coated with an active positive electrode material mix 123 and a negative plate 124 constituted with a negative foil CF coated with an active negative electrode material mix 125. An uncoated area 122A, where the positive foil AF is left exposed with no active positive electrode material mix 123 applied, to function as a positive electrode connector portion, is formed at the positive plate 122. An uncoated area 124A, where the negative foil CF is left exposed with no active negative electrode material mix 125 applied, to function as a negative electrode connector portion is formed at the negative plate 124. The uncoated areas 122A and 124A, located at the two ends of the winding-type power generating element assembly 120 along the width of the winding-type power generating element assembly 120, each range along one of the two narrow side surfaces 114N of the battery case.

Assuming that the battery cell 10 is a lithium ion battery cell, the positive foil AF and the negative foil CF in the battery cell 10 may be respectively constituted of aluminum and copper, whereas the active positive electrode material mix and the active negative electrode material mix used in such a battery cell may be, for instance, lithium cobalt oxide and graphite respectively. In addition, the positive electrode current collector 106 and the negative electrode current collector 105 should be formed by using the same materials as those constituting the positive foil AF and the negative foil CF respectively.

The positive electrode current collector 106 is connected to the uncoated area 122A of the positive plate 122. The negative electrode current collector 105 is connected to the uncoated area 124A of the negative plate 124. The positive electrode output portion 108 is provided as an integrated part of the positive electrode current collector 106. The negative electrode output portion 107 is provided as an integrated part of the negative electrode current collector 105.

The positive and negative electrode current collectors 106 and 105, formed substantially in the shape of the letter L, are fixed to the battery lid 103.

The positive electrode current collector 106 and the negative electrode current collector 105 are integrated parts formed through press machining of an aluminum plate and a copper plate respectively. The positive and negative electrode current collectors 106 and 105 respectively include mounting portions 161 and 151 ranging along the inner surface of the battery lid 103 toward the area near the inner sides of the narrow side surfaces 114N of the battery case 114. The positive electrode output portion 108 and the negative electrode output portion 107 respectively project out at the mounting portions 161 and 151. The positive electrode output portion 108 and the negative electrode output portion 107 are cylindrical portions formed through press machining so as to project from the mounting portions 161 and 151 each constituted with a flat plate, with a bus bar 26, to be described later, welded onto the top surfaces of the cylindrical portions.

The positive electrode current collector 106 and the negative electrode current collector 105 respectively include connector portions 162 and 152 extending from the ends of the mounting portions 161 and 151 toward the bottom surface of the battery case 114 along the narrow side surfaces 114N in a direction substantially perpendicular to the mounting portions. The connector portions 162 and 152 respectively extend along the uncoated portions 122A and 124A of the positive and negative plates 122 and 124. At the connector portions 162 and 152, a positive electrode power generating element connector portion 163 and a negative electrode power generating element connector portion 153 are respectively formed so as to face opposite the uncoated portions 122A and 124A of the positive and negative plates 122 and 124. The positive electrode power generating element connector portion 163 and the negative electrode power generating element connector portion 153 are respectively formed by bending the connector portions 162 and 152, extending parallel to the narrow side surfaces 114N, toward the center of the container at a right angle so as to range along the wide side surfaces 114W. The positive and negative electrode power generating element connector portions 163 and 153 are respectively bonded to the uncoated portions 122A and 124A through ultrasonic welding.

Figure 9:
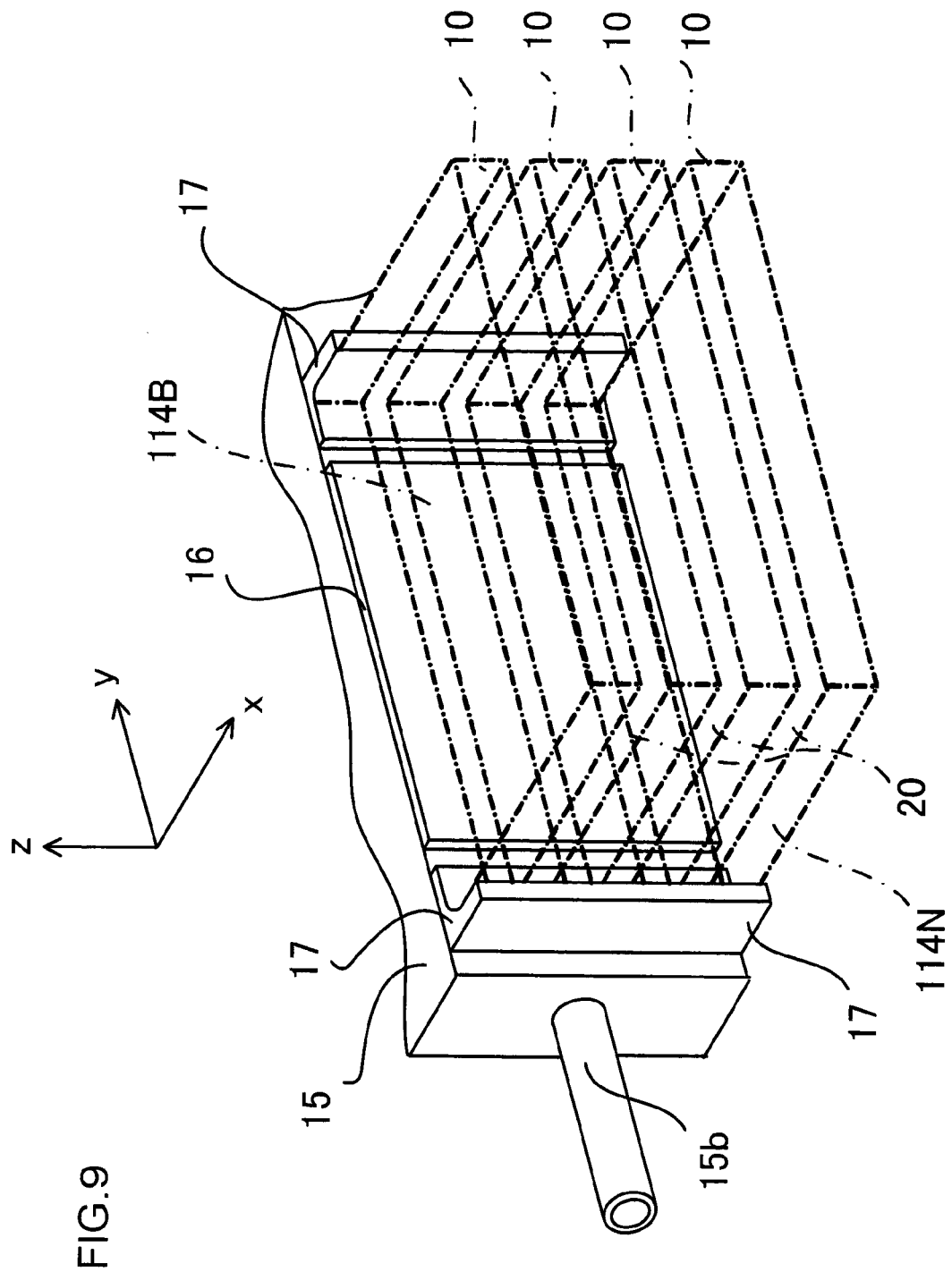
FIG. 9 shows a perspective showing the structure adopted in the electric storage module in FIG. 1 to connect the cooling plate and the battery cells so as to achieve thermal conduction.
Figure 10:
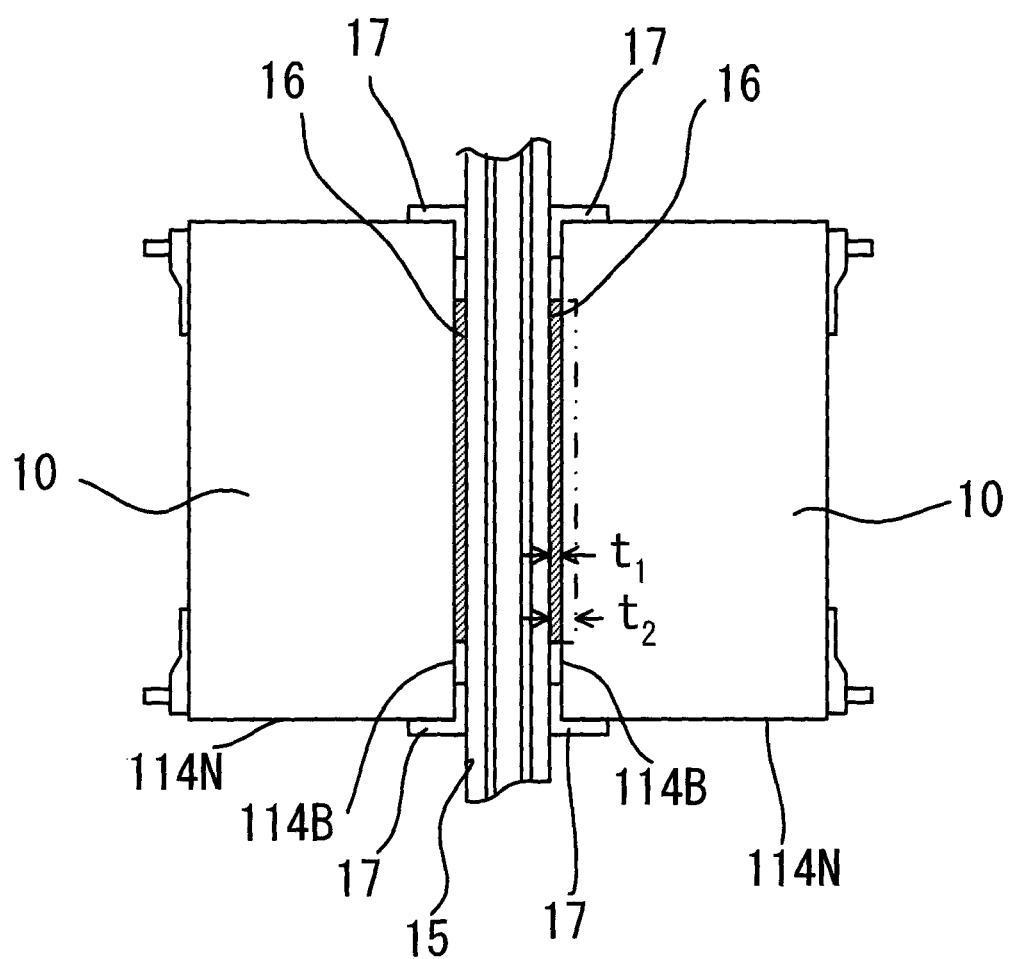
FIG. 10 shows a plan view of the connecting structure in FIG. 9 taken from above.

FIG. 9 is a perspective showing the connecting structure with which the battery cells 10 and the cooling plate 15 are connected so as to achieve thermal conduction, whereas FIG. 10 is a plan view of the structure in FIG. 9, viewed from above. Battery cell mounting plates 17 with sides thereof assuming an L-shape, are attached at positions where the individual battery cells 10 are mounted at the front and rear surfaces of the cooling plate 15. At each surface of the cooling plate, a pair of battery cell mounting plates 17, achieving symmetry and set apart from each other over a distance extending along the y direction (along the length of each battery cell 10), are attached at the corners where the bottom surfaces (case bottom surfaces) 114B and the narrow side surfaces 114N of the individual battery cells 10 join each other. The battery cell mounting plates 17 assume a heightwise dimension measured along the z direction that allows them to hold together four stages of battery cells 10 with the cell separator plates 20 inserted between the individual stages. Three pairs of battery cell mounting plates 17 are disposed both on the front surface side and on the rear surface side of the cooling plate 15, and the three 4-stage stacks of battery cells 10 are thus each held with one of the three pairs of the battery cell mounting plates 17 on each side. The battery cell mounting plates 17, formed by using a resin material achieving an insulating property, create a clearance $t_1$ between the front surface of the cooling plate 15 and the bottom surfaces 114B of the battery cells 10 and between the rear surface of the cooling plate 15 and the bottom surfaces 114B of the battery cells 10 (see FIG. 10).

Thermally conductive members 16, the dimensions of which are defined in correspondence to the plate thickness of the battery cell mounting plates 17, are each disposed in the space formed between the bottom surfaces 114B of the battery cells 10 and the front surface (or the rear surface) of the cooling plate 15. Before the battery cells 10 are mounted, the thermally conductive members 16 assume a thickness $t_2$, as indicated by the two-point chain line in FIG. 10. In other words, once the battery cells 10 are mounted, the thermally conductive members 16 become compressed with a compressibility factor of $(t_2-t_1) \times 100/t_2$ (%). As a result, the bottom surfaces 114B of the individual battery cells 10 and the front surface (or the rear surface) of the cooling plate 15 are connected so as to assure thermal conduction with a high degree of reliability. As a result, the battery cells 10 can be cooled by the cooling plate 15 through thermal conduction. While the compressibility factor set for the thermally conductive members 16 needs to be managed in order to ensure that they do not become permanently deformed, the thickness $t_1$ of the compressed thermally conductive members 16 is determined in correspondence to the wall thickness of the battery cell mounting plate 17 and thus the management is greatly facilitated in the embodiment.

The thermally conductive members 16 may each be constituted with a thermally conductive sheet with an insulating property, which assures a coefficient of thermal conductivity, to be equal to or higher than 1 W/m·K. Thermally conductive members 16 constituted of a metal material may be used in conjunction with battery cells 10 with the bottom surfaces 114B thereof coated with an insulating resin. In addition, if the bottom surfaces 114B and the narrow side edges 114N of the battery cells 10 are covered with an insulating material, the cooling block 15a of the cooling plate 15 may be formed by using a metal material, as well.

The positive electrode current collector 106 or the negative electrode current collector 105 is not connected to the battery case 114 at each battery cell 10. However, the positive electrode-side potential and the negative electrode-side potential are applied via the electrolyte filling the battery case 114 and, as a result, the battery case 114 of the battery cell 10 assumes a potential different from that at the positive electrode and the negative electrode. This means that a short circuit is bound to occur if battery cases 114 become electrically connected with one another.

The thermally conductive members 16 and the battery cell mounting plates 17 are disposed between the cooling plate 15 and the battery cells 10 in the embodiment of the present invention. In other words, the presence of the thermally conductive members 16 and the battery cell mounting plates 17 disallows direct contact between the cooling plate 15 and the battery cells 10 and thus, even if condensation accumulates at the cooling plate 15, the battery cells 10 will not become shorted, and thus, a high level of reliability is assured.

As long as the wide side surfaces 114W of the battery cells 10 are covered with an insulating material, the cell separator plates 20 and the end plates 21 can be formed by using a material achieving a high level of thermal conductivity, such as aluminum, die-cast aluminum, copper or iron. If, on the other hand, the wide side surfaces 114W of the battery cells 10 are not covered with an insulating material, the cell separator plates 20 and the end plates 21 may be formed by using, for instance, polypropylene, polyamide, polyether amide, PPS, PPA or PBT, or by using a resin assuring a high level of thermal conductivity.

Figure 4:
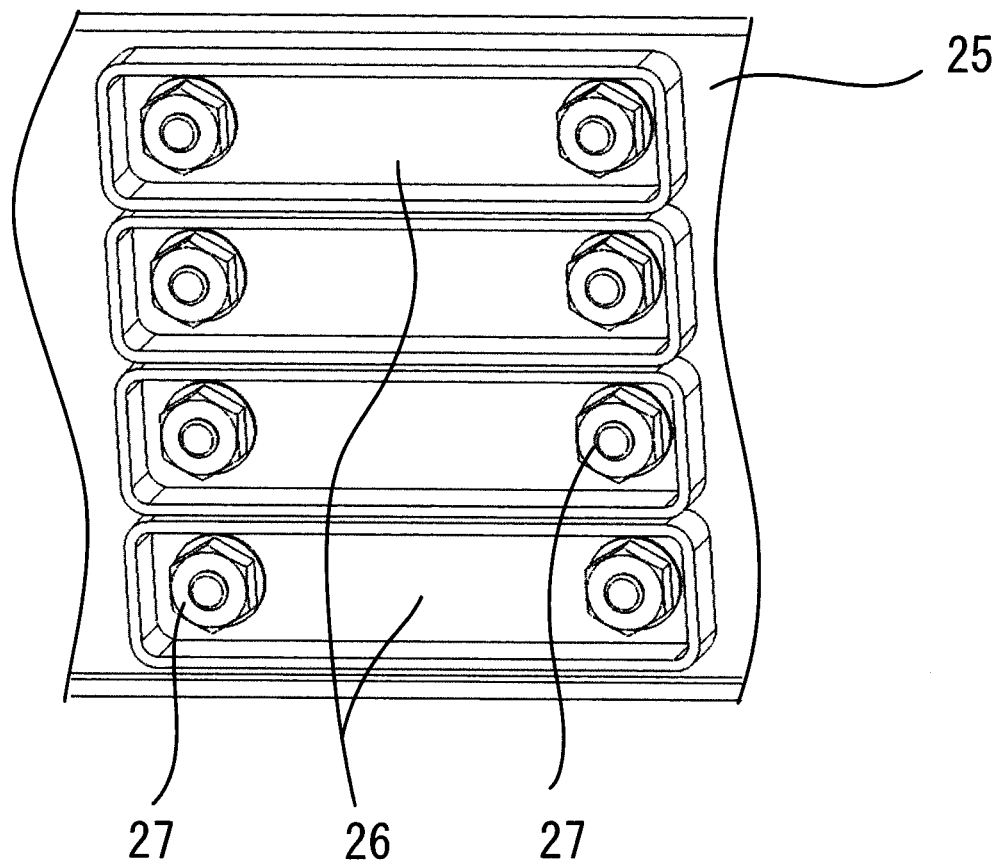
FIG. 4 shows an enlarged perspective of a bus bar mounting structure with which bus bars are mounted in the electric storage module shown in FIG. 1.

As shown in FIG. 1, bus bars 26 are attached on the outer surface sides of the terminal covers 25. FIG. 4 shows, in an enlarged perspective, the mounting structure with which bus bars 26 are mounted. The bus bars 26 sustaining contact with the positive electrode output portions 108 and the negative electrode output portions 107 of the individual battery cells 10 are locked onto a terminal cover 25 with nuts 27. The nuts 27 may be, for instance, lock nuts (or hexagon nut with flange) or nuts with spring washers (or hexagon nut with disc spring). As an alternative, nuts and conical washers may be used together in combination.

Figure 5:
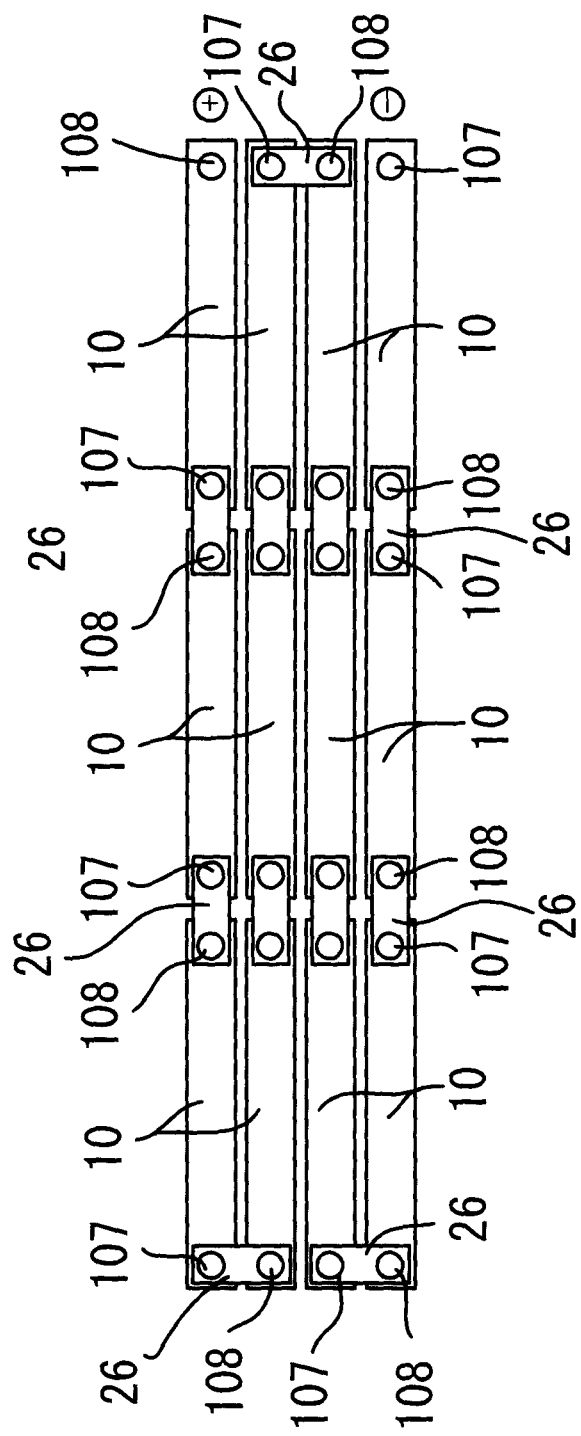
FIG. 5 shows a side elevation of the battery module in FIG. 1, with a cover thereof removed.

FIG. 5 shows the three four-stage stacks of battery cells 26 all connected in series via the bus bars 26.

FIG. 5 shows that the negative electrode output portion 107 of the battery cell 10 located at the left end of the uppermost stage and the positive electrode output portion 108 of the battery cell 10 located at the left end on the second highest stage are connected with each other via a bus bar 26. The negative electrode output portion 107 of the battery cell 10 located at the right end of the second highest stage and the positive electrode output portion 108 of the battery cell 10 located at the right end of the third highest stage are connected with each other via a bus bar 26. The negative electrode output portion 107 of the battery cell 10 located at the left end of the third highest stage and the positive electrode output portion 108 of the battery cell 10 located at the left end of the lowermost stage are connected with each other via a bus bar 26. The negative electrode output portions 107, assuming middle positions, are each connected, via a bus bar 26, with the positive electrode output portion 108 of an adjacent battery cell 10. The battery cells 10 in the three four-stage stacks are thus all connected in series. This connecting structure creates a potential difference between the positive electrode output portion 108 of the battery cell 10 at the right end of the uppermost stage and the negative electrode output portion 107 of the battery cell 10 at the right end of the lowermost stage, the extent of which is equivalent to the potential difference occurring when 12 battery cells 10 are connected in series.

With the bus bars 26 mounted on the outer sides of the terminal covers 25 and connecting in series all the battery cells 10 disposed both on the front surface side and on the rear surface side of the cooling plate 10, as described above in reference to FIG. 1, the covers 28 are each disposed on the outer side of one of the terminal covers 25. The covers 28 are disposed so as to cover the entire outer side surfaces of the terminal covers 25 so as to prevent entry of electrically conductive foreign matter such as water, dust, grease or a compound material into the space between the bus bars 26. However, the covers 28 are not absolutely essential to the present invention.

As shown in FIG. 2, with the battery cells 10 connected in series via the bus bar 26, the terminal covers 25 are attached to the end plates 21 with clips 30 constituted of an elastic material.

Figure 3:
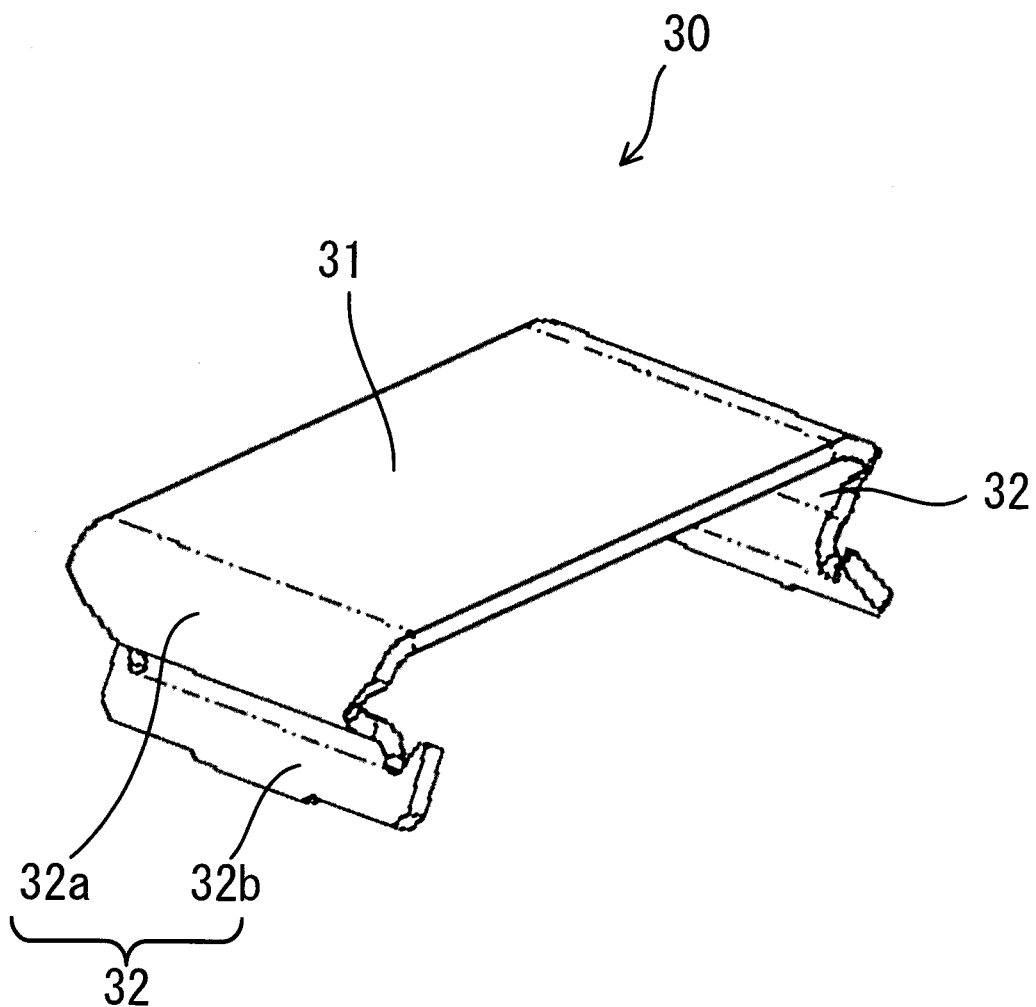
FIG. 3 shows a perspective providing an external view of a clip with which battery cells in the electric storage module shown in FIG. 1 are pressed against a cooling plate.

FIG. 3 is a perspective presenting an external view of a clip 30. The clip 30 is formed by press-machining a metal plate. Flexible portions 32, which can be pulled open outward are formed each on one of the two sides of a base 31 of the clip 30. The flexible portions 32 are each made up with a support portion 32a located closer to the base 32 with sides forming a V-shape and a fitting portion 32b ranging from the support portion 32a at a tilt, which can be pulled open toward the outside.

(Assembling the Electric Storage Module)

The electric storage module 1 is assembled by first attaching the three pairs of battery cell mounting plates 17 on each side of the cooling plate 15, i.e., both on the front surface side and on the rear surface side of the cooling plate 15. The thermally conductive members 16 are then each installed in the space between a battery cell mounting plate 17 and the battery cell mounting plate 17 paired up with the first mounting plate. In the space between the battery cell mounting plates 17 in each pair, a four-stage stack of battery cells 10, with the cell separator plates 20 inserted between the individual battery cell stages, is positioned. The end plates 21 are then set, one over the upper surfaces of the uppermost-stage battery cells 10 and the other over the lower surfaces of the lowermost battery cells 10, and stud bolts 6 inserted through openings at the individual end plates 21 and openings formed on the front side and the rear side of the cell separator plates 20 are locked with nuts 24 (see FIG. 1). In addition, an opening (not shown) passing through the cooling plate 15 along the z (height-wise) direction is formed at the cooling plate 15 and a stud bolt (not shown) inserted through the opening at the cooling plate is locked with nuts 22 (see FIG. 2). However, the assembly is locked with the nuts 22 and 24 on a temporary basis at this time.

Next, the terminal covers 25 are attached so as to cover the side surfaces of the battery cells 10 and the cell separator plates 20, and the individual battery cells 10 are connected with one another via the bus bars 26. Next, the terminal covers 25 are locked onto the end plates 21 with the clips 30. Each bent portion 21a of an end plate 21 and the outer side surface of the terminal cover 25 located on the matching side, are positioned in the space formed between fitting portions 32b on the two sides of the corresponding clip 30. Subsequently, an external force is applied so as to press down the clips 30 and, in response, the clips 30, with the tilts of their fitting portions 32b allowing them to open toward the outside, become pressed down.

Once the clips 30 are pushed down into place, the elastic force of the clips 30 causes displacement of the terminal covers 25 toward the end plates 21. As a result, the bottom surfaces 114B of the individual battery cells 10 compress the thermally conductive members 16. Consequently, a connecting structure, whereby reliable thermal conduction between the bottom surfaces 114B of the battery cells 10 and the cooling plate 15 is assured, is achieved.

The nuts 22 and 24 are tightened to final torque in this state and the battery module 1 shown in FIG. 2 is thus assembled.

(Electric Storage Device)

An electric storage device, to be used as a power source device for a hybrid vehicle or an electric vehicle, is configured by housing a plurality of electric storage modules 1 in a case 5.

Figure 14:
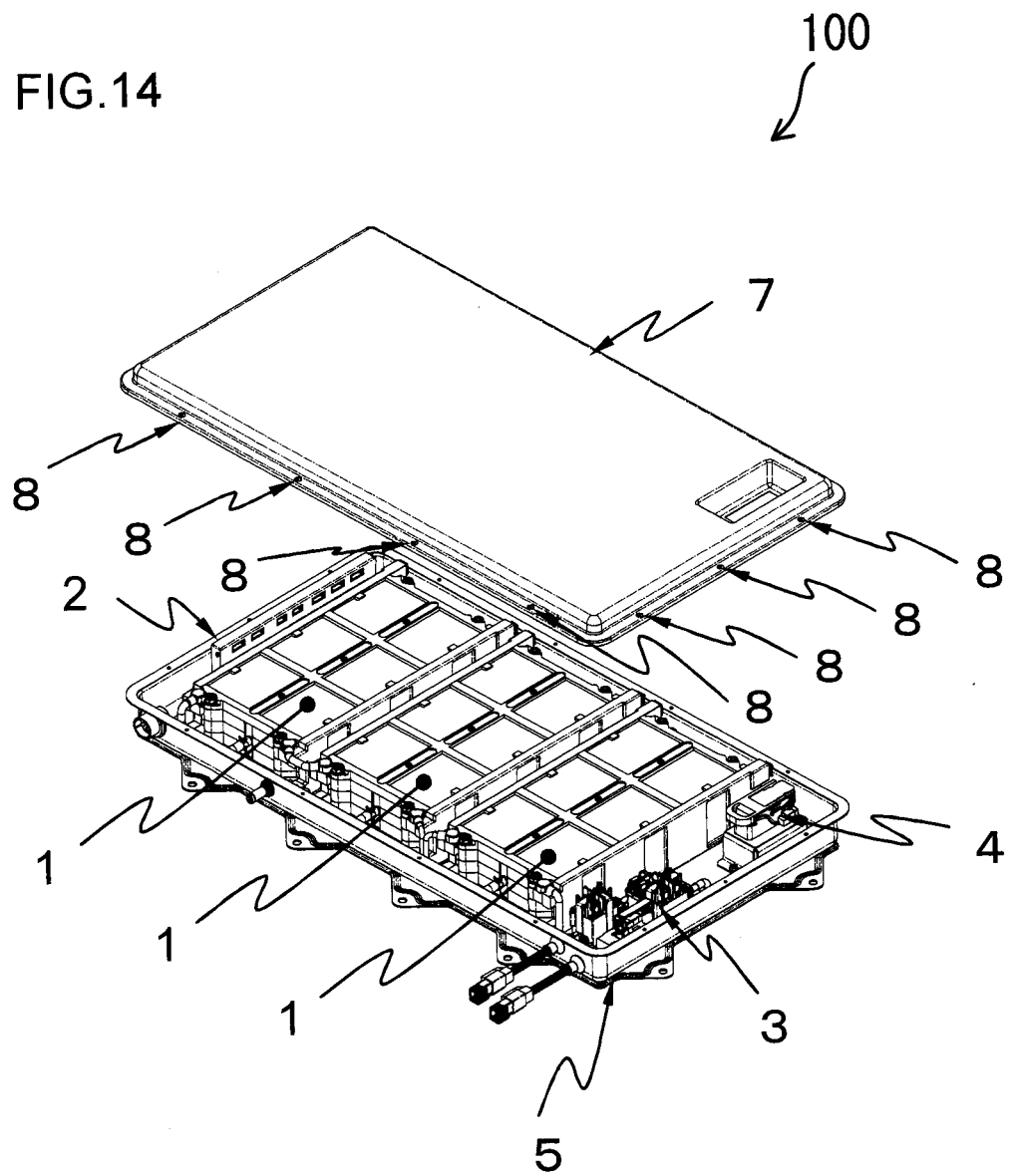
FIG. 14 shows a perspective of the electric storage device according to an embodiment of the present invention.
Figure 15:
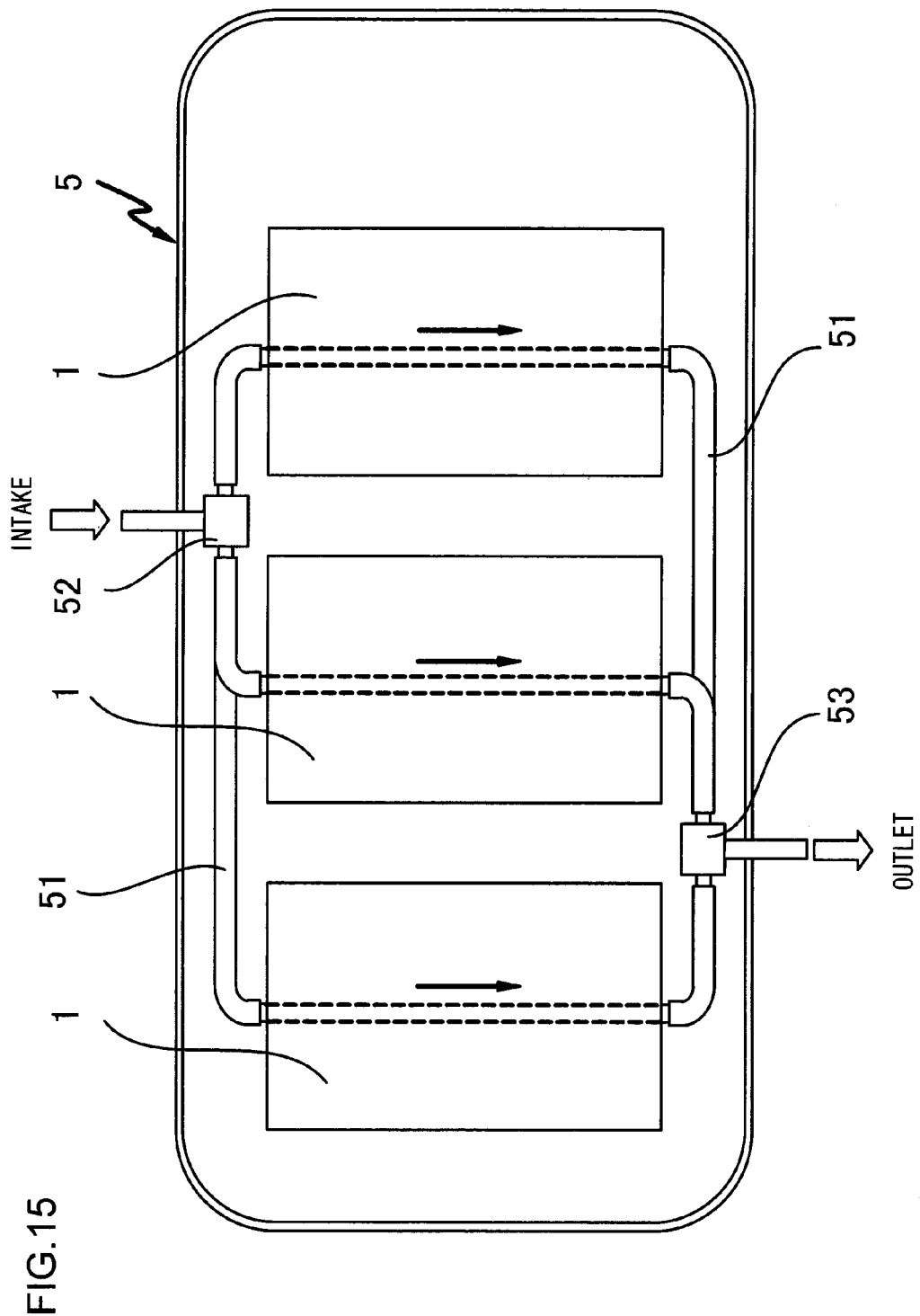
FIG. 15 is a plan view of the electric storage device shown in FIG. 14.
Figure 16:
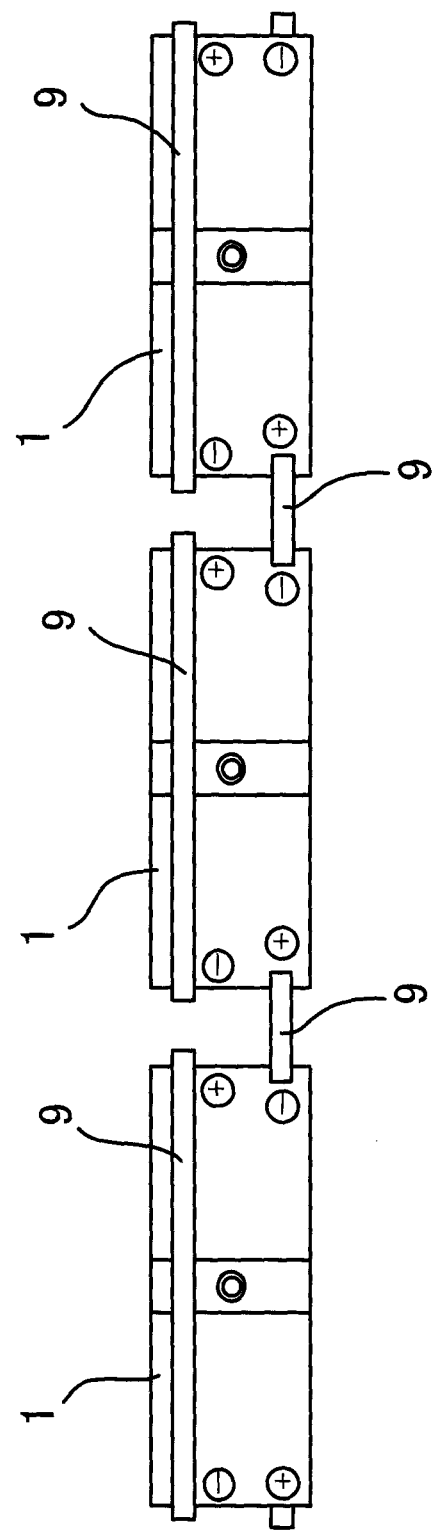
FIG. 16 is an illustration of electrical connections achieved in the electric storage device shown in FIG. 14.

FIG. 14 is a perspective of an electric storage device 100 and FIG. 15 illustrates the layout of the electric storage device 100. In addition, FIG. 16 illustrates the state of connection achieved by the individual electric storage modules 1 within the electric storage device 100.

As shown in FIG. 14, a plurality (three in the example presented in FIG. 14) of electric storage modules 1, connected to a battery control unit 2, a battery auxiliary device 3 and a disassembly current cutoff unit (or service disconnect unit) 4, are housed within the battery case 5. A battery cover 7 is locked onto the top side of the battery case 5 with screws 8. The battery cover 7 prevents entry of electrically conductive foreign matter originating from the outside, such as water, dust or a chemical substance, into the battery case. As shown in FIG. 16, the electric storage modules 1 are connected in series via high-voltage lines 9.

The pipes 15b of the cooling plate 15 at the individual electric storage modules 1 are connected via pipings 51, as shown in FIG. 15.

Branching pipe blocks 52 and 53 are disposed respectively on the entry side and on the exit side of the battery auxiliary device 3. Although not shown, the flow of a coolant such as water or refrigerant gas, supplied from a cooling device equipped with a cooling fan, a radiator, a compressor and the like, is branched at the entry side branching pipe block 52 and thus, the coolant is delivered to the cooling plates 15 of the individual electric storage modules 1. After cooling the battery cells 10 constituting each electric storage module 1 through thermal conduction, the gasified coolant is collected at the exit side branching pipe block 53 and is input to the compressor of the cooling device.

As described above, the electric storage module 1 and the electric storage device 100 achieved in embodiment 1 of the present invention include battery cells 10 disposed along the y (lengthwise) direction both on the front surface side and on the rear surface side of a cooling plate 15 so as to assure improved cooling efficiency and enable overall miniaturization.

Since the battery cells 10 are stacked over a plurality of stages along the z (height-wise) direction with cell separator plates 20 inserted between the individual battery cell stages, a further improvement in the cooling efficiency is achieved.

Since the battery cells 10 are thermally coupled with the cooling plate 15 via the thermally conductive members 16, the battery cells 10 do not become short circuited with one another even if condensation develops at the cooling plate 15.

Since the battery cell mounting plates 17 are attached between the cooling plate 15 and the bottom surfaces 114B of the individual battery cells 10, the compressibility factor of the thermally conductive members 16 can be controlled with ease in order to ensure that the compressibility factor remains in a range within which no permanent deformation occurs.

Since the bottom surfaces 114B of the battery cells 10 can be pressed against the thermally conductive members 16 simply by pressing down the clips 30 astride the terminal covers 25 and the bent portions 21a of the end plates 21, the electric storage module can be assembled with ease and the battery cells 10 can be cooled with greater reliability.

It is to be noted that while an end plate 21 is directly attached over the upper surfaces of the battery cells 10 in the structure achieved in the embodiment, an insulating plate may be disposed between the battery cells 10 and the end plates 21 instead. In such a case, an end plate 21 constituted of a metal material such as aluminum, die-cast aluminum, copper or iron can be used.

In addition, the clips 30 are used as elastic members that pull the terminal covers 25 toward the end plates 21. However, the present invention is not limited to this example and the terminal covers may be pulled toward the end plates with elastic members other than the clips 30. For instance, the positions of the terminal covers 25 relative to the end plates 21 may be adjusted with tension springs bridging the terminal covers 25 and the end plates 21, or by fixing the covers 28 to the end plates 21 and installing compression springs, plate springs, conical springs or the like at the covers 28 so as to impart a force to the terminal covers 25.

As a further alternative, the terminal covers 25 may be pushed toward the end plates 21 with fastening members instead of elastic members. An example of a structure that may be adopted in conjunction with such fastening members is described below in reference to embodiment 2.

—Embodiment 2—

Figure 17:
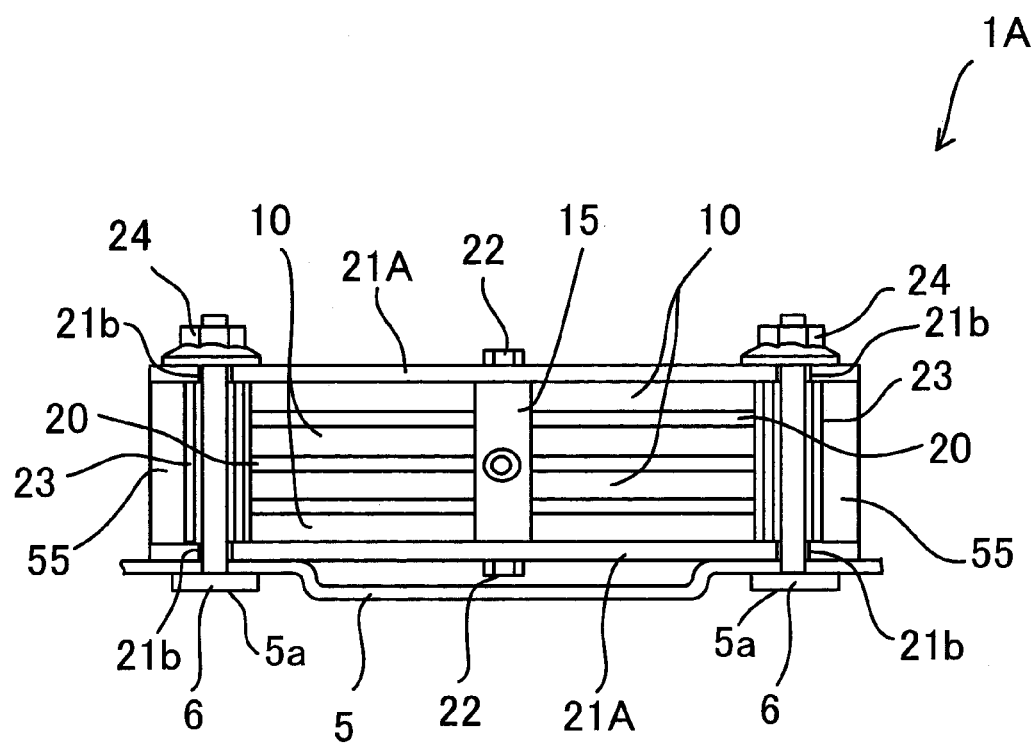
FIG. 17 shows a front view of the electric storage module according to embodiment 2 of the present invention.
Figure 18:
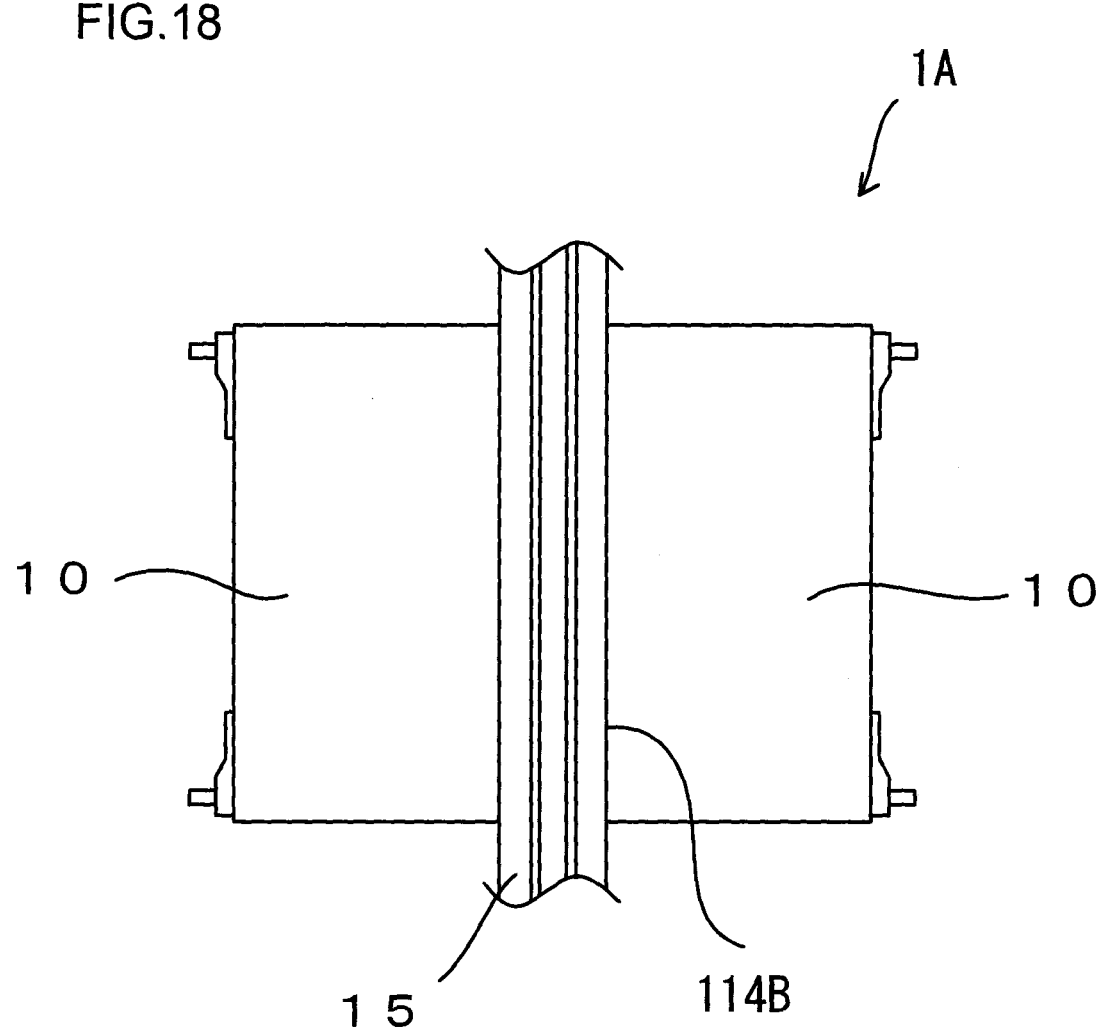
FIG. 18 is a plan view showing the structure adopted in the electric storage module in FIG. 17 to connect the cooling plate and the battery cells so as to achieve thermal conduction.

FIG. 17 is a front view of an electric storage module 1A according to embodiment 2 of the present invention, and FIG. 18 shows the mounting structure with which the cooling plate 15 and the battery cells 10 are mounted in the electric storage module 1A in FIG. 17.

As shown in FIG. 17, the electric storage module 1A in embodiment 2, unlike the electric storage module in embodiment 1, does not include clips 30. End plates 21A, disposed at the top and the bottom, each extend further forward beyond the front ends of the battery cells 10, with openings 21b formed at the two side edges thereof.

Holding plates 51, each having a through hole with a diameter greater than that of the openings 21b of the end plates 21A, are disposed on the side where the front ends of the battery cells 10 are located. Collars 23, inserted through the through holes at the holding plates 55, are disposed between the upper and lower end plates 21A. The collars 23 each include a through hole formed therein with the diameter thereof set greater than the openings 21b of the end plates 21A. In addition, openings 5a are formed at the battery case 5, with stud bolts 6, each inserted through an opening 5a at the battery case 5, an opening 21b of the bottom side end plate 21, a collar 23 and an opening 21b of the top side end plate 21A, projecting out through the top surface of the upper-side end plate 21A. Locking nuts 24 are fastened onto the projecting portions of the stud bolts 6.

The openings 21b at the end plates 21A are formed so as to assume a diameter greater than the diameter of the stud bolts 6, and thus, after the locking nuts 24 are temporarily fastened onto the stud bolts 6, the individual battery cells 10 can be displaced together with the collars 23 towards the cooling plate 15.

Namely, the battery cell in the embodiment 2 is assembled by temporarily fastening the battery cells 10 with the stud bolts 6 and the locking nuts 24, pressing the holding plates 55 from the outside so as to press the battery cells 10 together with the collars 23 toward the cooling plate 15 and then tightening the locking nuts 24 to final torque. The bottom surfaces 114B of the individual battery cells 10 in this structure come into direct contact with the front surface or the rear surface of the cooling plate 15, as illustrated in FIG. 18. In other words, the structure is distinguishable from that in embodiment 1 in that no thermally conductive members 16 are present between the bottom surfaces 114B of the battery cells and the cooling plate.

Advantages similar to those of embodiment 1 are achieved through embodiment 2 structured as described above. In addition, since the structure in embodiment 2 does not include the thermally conductive members 16 or the battery cell mounting plate 17, better productivity and lower costs over embodiment 1 are achieved.

—Embodiment 3—

Figure 19:
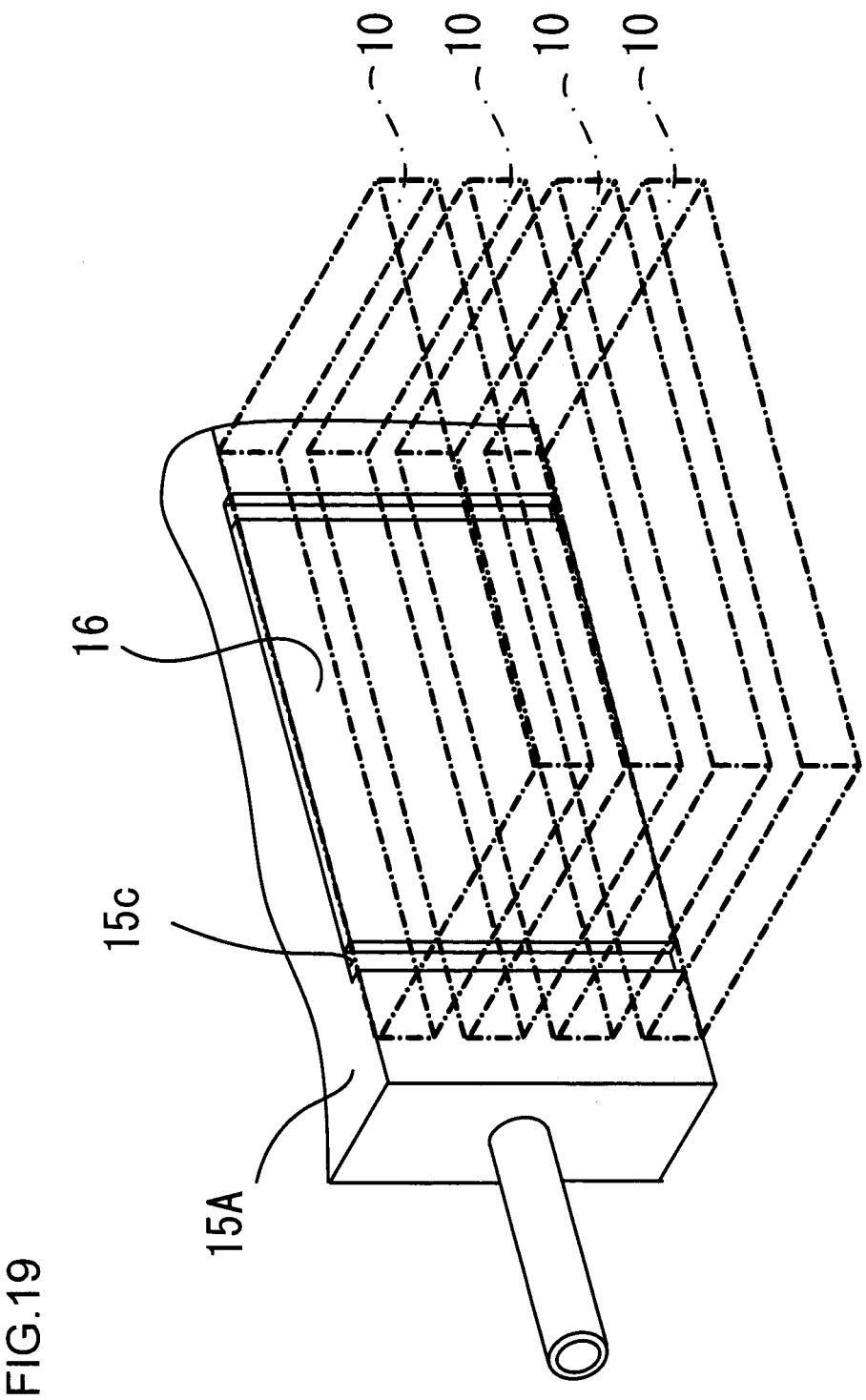
FIG. 19 is a perspective showing the structure adopted in the electric storage module according to embodiment 3 of the present invention to connect the cooling plate and the battery cells so as to achieve thermal conduction.
Figure 20:
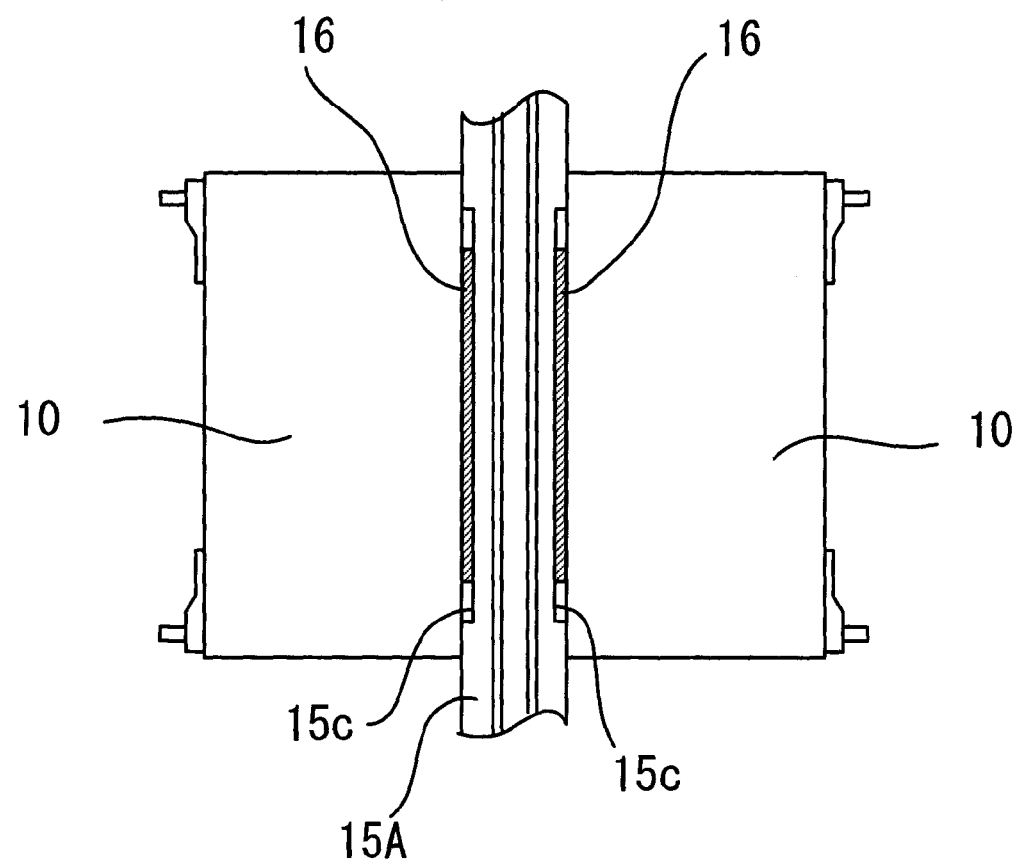
FIG. 20 shows a plan view of the connecting structure in FIG. 19 taken from above.
Figure 21:
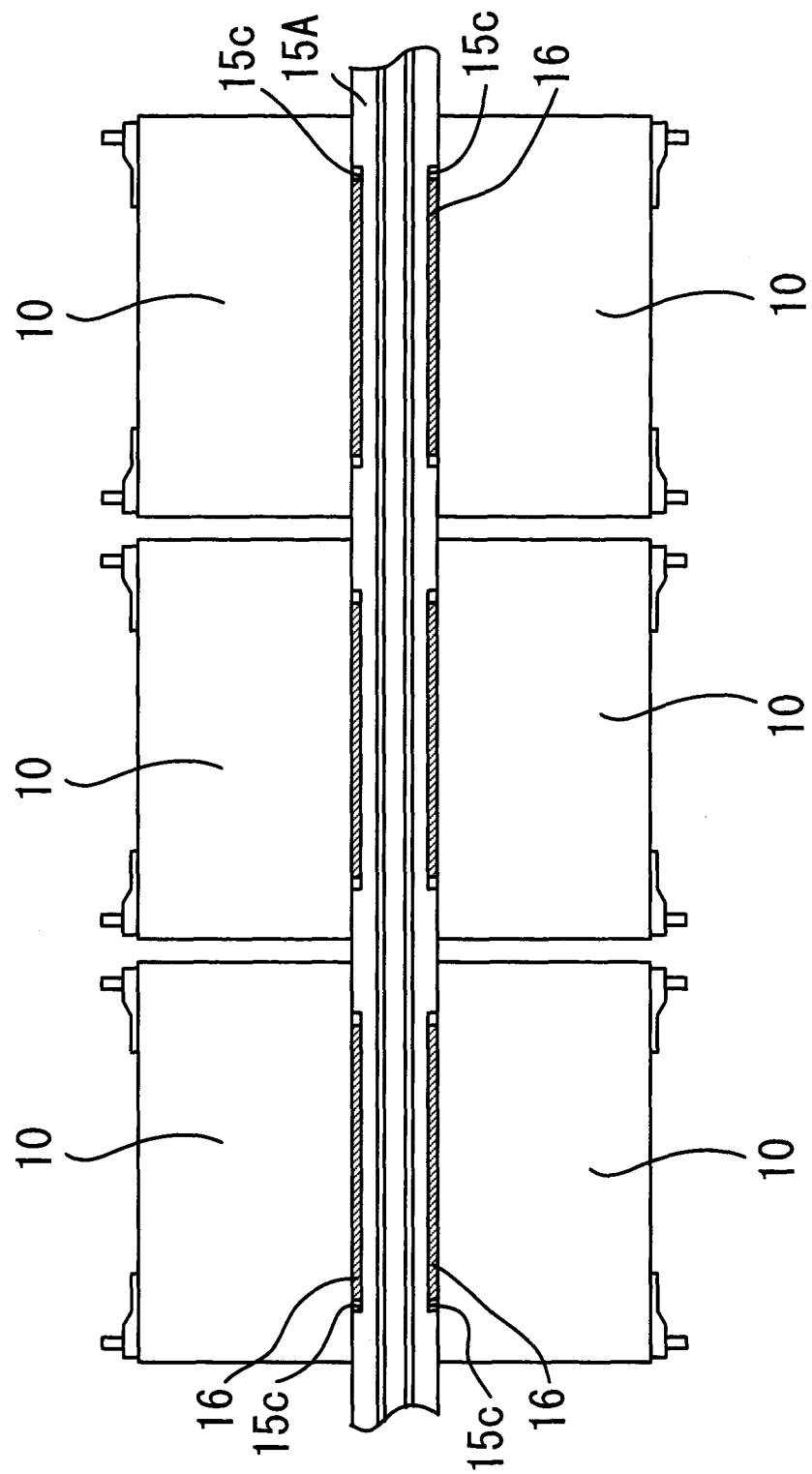
FIG. 21 shows a plan view of a plurality of battery cells arrayed by adopting the connecting structure shown in FIG. 20.

FIGS. 19 through 21 illustrate the electric storage module according to embodiment 3 of the present invention.

FIG. 19 is a perspective showing the connecting structure with which the cooling plate 15A and the battery cells 10 are connected, FIG. 20 is a plan view of a connecting structure with which the cooling plate 15A and a given battery cell 10 are connected and FIG. 21 is a plan view of the connecting structure with which the cooling plate 15A and three battery cells 10 are connected.

Recessed portions 15c are formed at the cooling plate 15A over areas thereof that would come into contact with the individual battery cells 10 in embodiment 3. Each recessed portion 15c ranges along the entire height of the cooling plate 15A, with a thermally conductive member 16 housed within the recessed portion 15c. Each battery cell 10 contacts a thermally conductive member 16, with its bottom surface 114B sustaining direct contact with the front surface or the rear surface of the cooling plate 15A.

The recessed portions 15c are formed so as to assume a depth within which the compressibility factor of the thermally conductive members 16, before and after the battery cells 10 come into contact with the thermally conductive members 16, can be managed to ensure that no permanent deformation of the thermally conductive members 16 occurs.

Advantages similar to those of embodiment 1 are achieved through embodiment 3 structured as described above. In addition, since the structure in embodiment 3 does not include the battery cell mounting plate 17, better productivity is achieved over embodiment 1.

—Embodiment 4—

Figure 22:
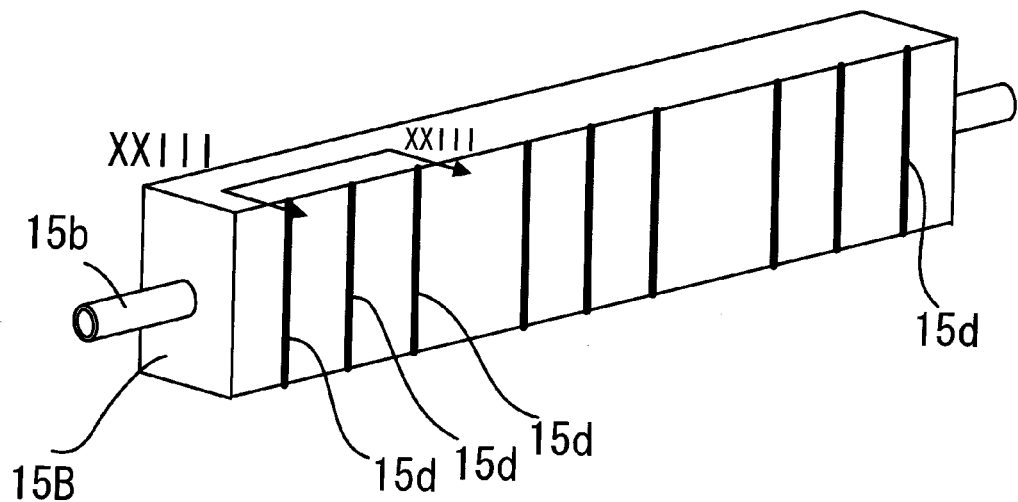
FIG. 22 shows a perspective of the cooling plate in the electric storage module according to embodiment 4 of the present invention.
Figure 23:
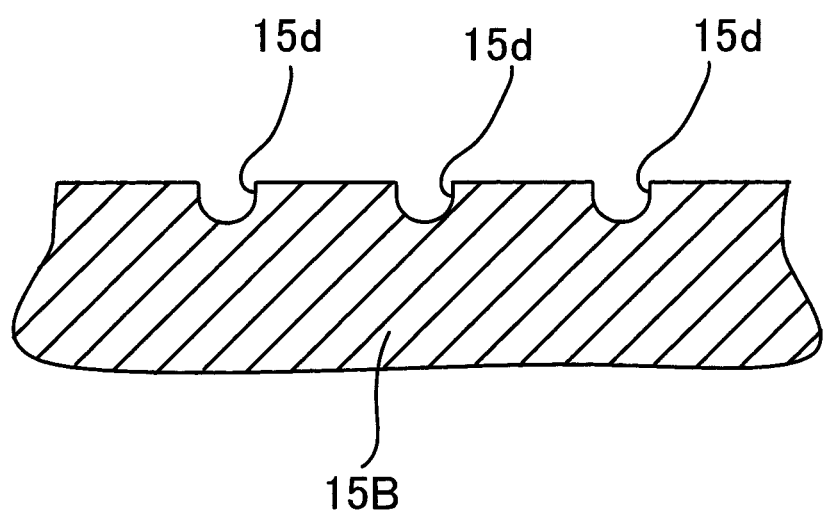
FIG. 23 shows an enlarged sectional view taken through line XXIII-XXIII in FIG. 22.

FIGS. 22 and 23 illustrate the electric storage module according to embodiment 4 of the present invention.

FIG. 22 shows a cooling plate 15B in a perspective, whereas FIG. 23 is an enlarged sectional view of the cooling plate in FIG. 22, taken along line XXIII-XXIII.

As shown in FIG. 22, a plurality of linear grooves 15d, each ranging over the entire height-wise length of the cooling plate, are formed at the cooling plate 15B. As shown in FIG. 23, the grooves 15d have a semicircular section.

While the thermally conductive members 16 are attached to the cooling plate 15 to assure thermal conduction between the cooling plate 15 and the battery cells 10 via the thermally conductive members 16, air pockets may be formed between the thermally conductive members 16 and the cooling plate 15. Since the coefficient of thermal conductivity of air is low, the presence of such air pockets is bound to result in uneven cooling of the battery cells 10 via the cooling plate 15. The grooves 15d fulfill a function of releasing air that would otherwise be trapped at the thermally conductive members 16.

With the cooling plate 15B having the grooves 15d formed thereupon, air that would otherwise be trapped at the thermally conductive members 16 can be released through the grooves 15d and thus, the extent of cooling inconsistency of the battery cells 10 can be reduced. In addition, even if condensation occurs at the cooling plate 15B, the condensation can be drained via the grooves 15d. The structure assumed in the cooling plate 15B with the grooves 15d formed thereat can be adopted in the cooling plate 15 and the cooling plate 15A respectively achieved in embodiment 1 and embodiment 3.

It is to be noted that the shape of the grooves 15b is not limited to the linear shape described above and the present invention allows for numerous variations with regard to the shape of the grooves 15d. For instance, they may assume a wavy shape or a zigzag shape. In addition, grooves running along the full height-wise length of the cooling plate 15 may be used in combination with branch grooves connected to them. Such branch grooves may extend along a direction intersecting the direction running along the height of the cooling plate 15 and they do not need to reach the ends of the cooling plate 15. Furthermore, the section of the grooves 15d does not need to assume a semicircular shape and the present invention allows for numerous variations with respect to the shape of the section of the grooves 15d. For instance, the grooves 15d may have a rectangular section, a V-shaped section, or a trapezoidal section with rounded or beveled corners.

—Embodiment 5—

Figure 24:
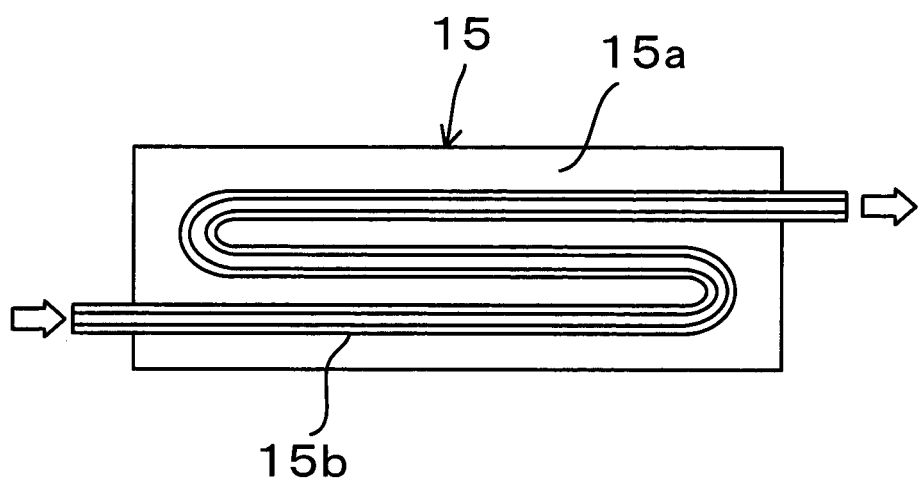
FIG. 24 shows a sectional view of the cooling plate in the electric storage module according to embodiment 5 of the present invention.

FIG. 24 is a sectional view of a cooling plate in the electric storage module according to embodiment 5 of the present invention.

At the cooling plate 15 achieved in embodiment 5, the pipe 15b is disposed at the cooling block 15a so as to follow a serpentine path along the y (lengthwise) direction in FIG. 1. The structure with battery cells 10 stacked over a plurality of stages along the height of the cooling plate 15 is bound to manifest temperature variance between the central area where the pipe 15b through which the coolant flows is disposed and the end areas along the height-wise direction. With the serpentine pipe 15b, the temperature variance manifesting along the height-wise direction at the cooling block 15a can be minimized.

The structure assumed in the cooling plate 15 in embodiment 5 can be adopted in any of the battery modules achieved in embodiments 1 through 4.

It is to be noted that the number of serpentine turns is not limited to that shown in FIG. 24 (one serpentine turn), and the cooling pipe may be allowed to have a plurality of serpentine turns.

—Embodiment 6—

Figure 25A:
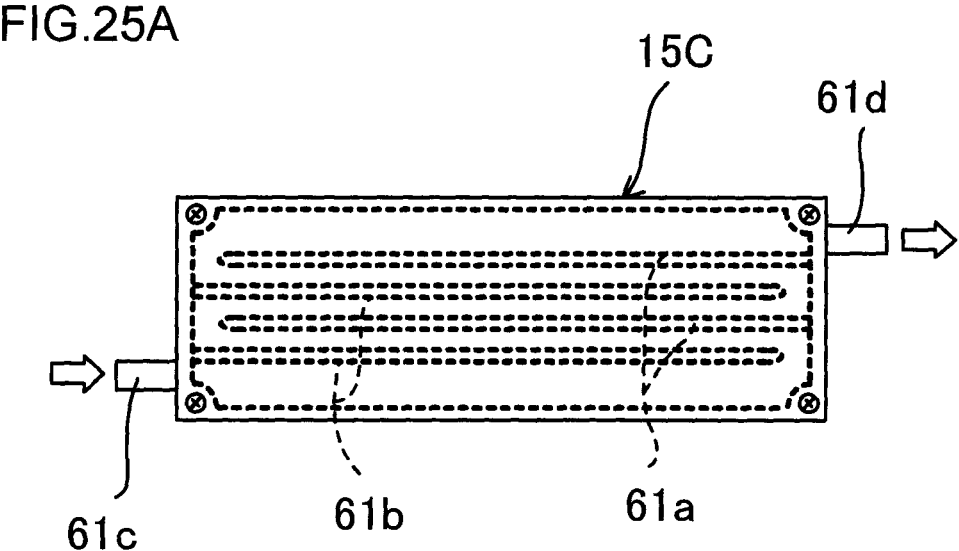
FIGS. 25A and 25B show a side elevation and a front view of the cooling plate in the electric storage module according to embodiment 6 of the present invention.
Figure 25B:
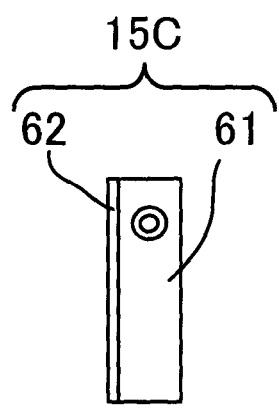

FIGS. 25A and 25B present a side view and a front view of a cooling plate according to embodiment 6 of the present invention.

A cooling plate 15C achieved in embodiment 6 is constituted with a cooling tank 61 and a tank cover 62. The cooling tank 61 includes barrier walls 61a and 61b ranging along the lengthwise direction alternately from the side located near the intake and from the side located near the outlet. The barrier walls 61a, each extending from one side toward the other side, end before reaching the other side. The barrier walls 61b, each extending from the other side toward the one side, end before reaching the one side. Barrier walls 61a and 61b are arrayed alternately to each other with a coolant flow passage formed between them.

An inflow pipe 61c and an outflow pipe 61d are formed at the cooling tank 61. The barrier walls 61a and 61b, the inflow pipe 61c and the outflow pipe 61d are molded as an integrated unit. The tank cover 62 is screwed onto the cooling tank 61.

At the cooling plate 15C achieved in embodiment 6, the coolant flow passage is formed over the entire range along the height of the cooling plate 15C so as to achieve a substantially even temperature distribution at the cooling plate 15C.

The structure assumed in the cooling plate 15C in embodiment 6 can be adopted in any of the battery modules achieved in embodiments 1 through 5.

(Variation 1)

Figure 26A:
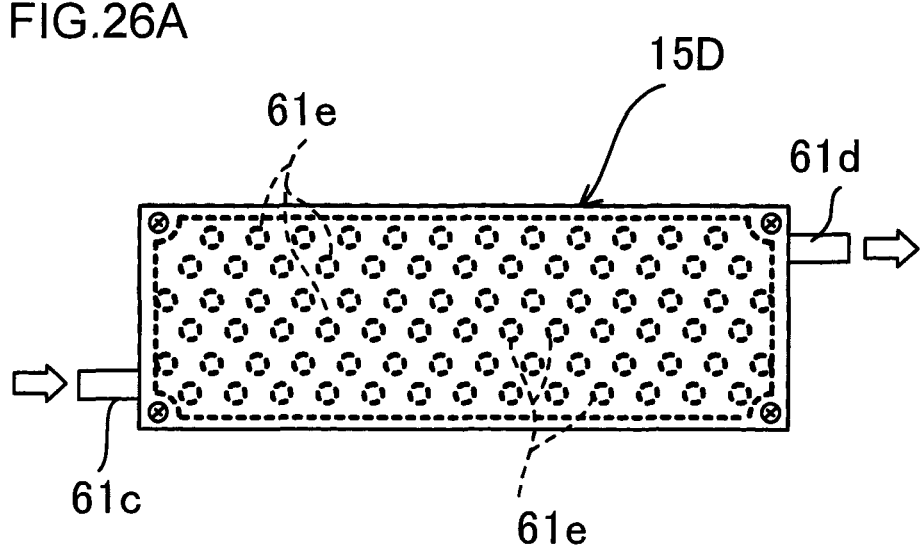
FIGS. 26A and 26B show a side elevation and a front view of a cooling plate achieved as variation 1 of the cooling plate in FIGS. 25A and 25B.
Figure 26B:
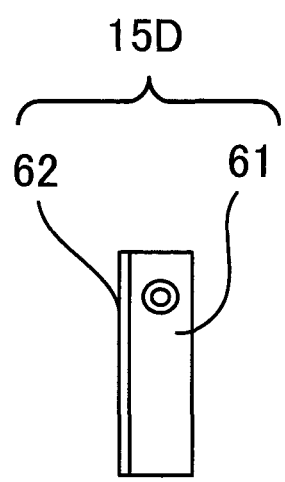

A cooling plate 15D shown in FIGS. 26A and 26B is an example of a variation of the cooling plate 15C in FIGS. 25A and 25B.

The cooling plate 15D is distinguishable from the cooling plate 15C in that it includes numerous pins 61e instead of the barrier walls 61a and 61b. The space between the individual pins 61e forms a coolant flow passage. Other structural features of the cooling plate 15D are similar to those in FIGS. 25A and 25B.

The cooling plate 15D in variation 1, too, includes a coolant flow passage formed over the entire range along the height of the cooling plate 15D so as to achieve a substantially even temperature distribution at the cooling plate 15D.

(Variation 2)

Figure 27A:
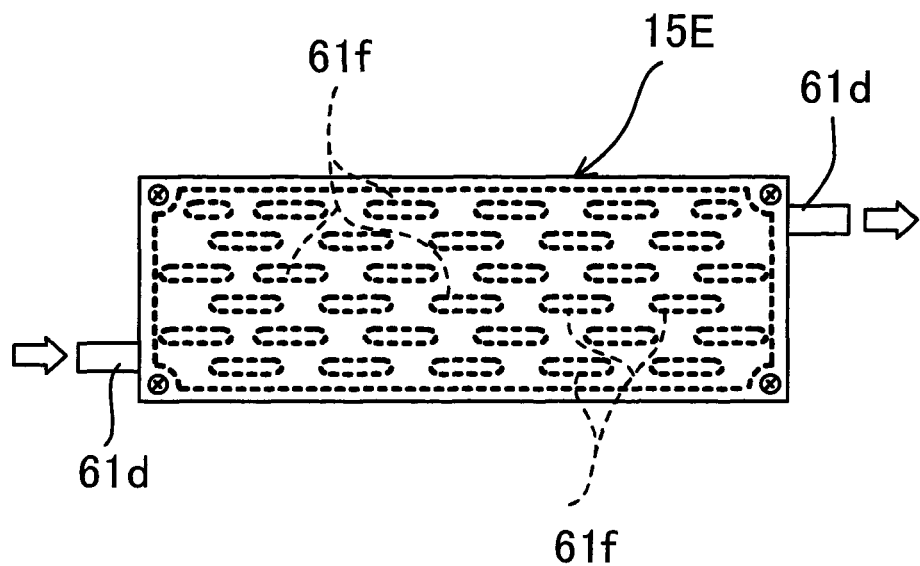
FIGS. 27A and 27B show a side elevation and a front view of a cooling plate achieved as variation 2 of the cooling plate in FIGS. 25A and 25B.
Figure 27B:
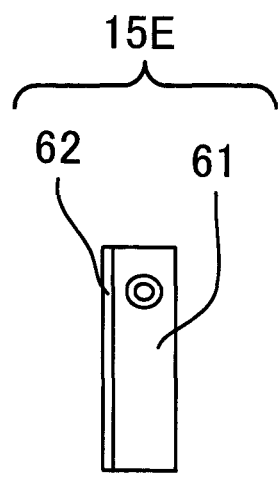

A cooling plate 15E shown in FIGS. 27A and 27B is a second example of a variation of the cooling plate 15C in FIGS. 25A and 25B.

The cooling plate 15E is distinguishable from the cooling plate 15C in that it includes numerous fins 61f instead of the barrier walls 61a and 61b. The space between the individual fins 61f forms a coolant flow passage. Other structural features of the cooling plate 15E are similar to those in FIGS. 25A and 25B.

The cooling plate 15E in variation 2, too, includes a coolant flow passage formed over the entire range along the height of the cooling plate 15E so as to achieve a substantially even temperature distribution at the cooling plate 15E.

—Embodiment 7—

Figure 28:
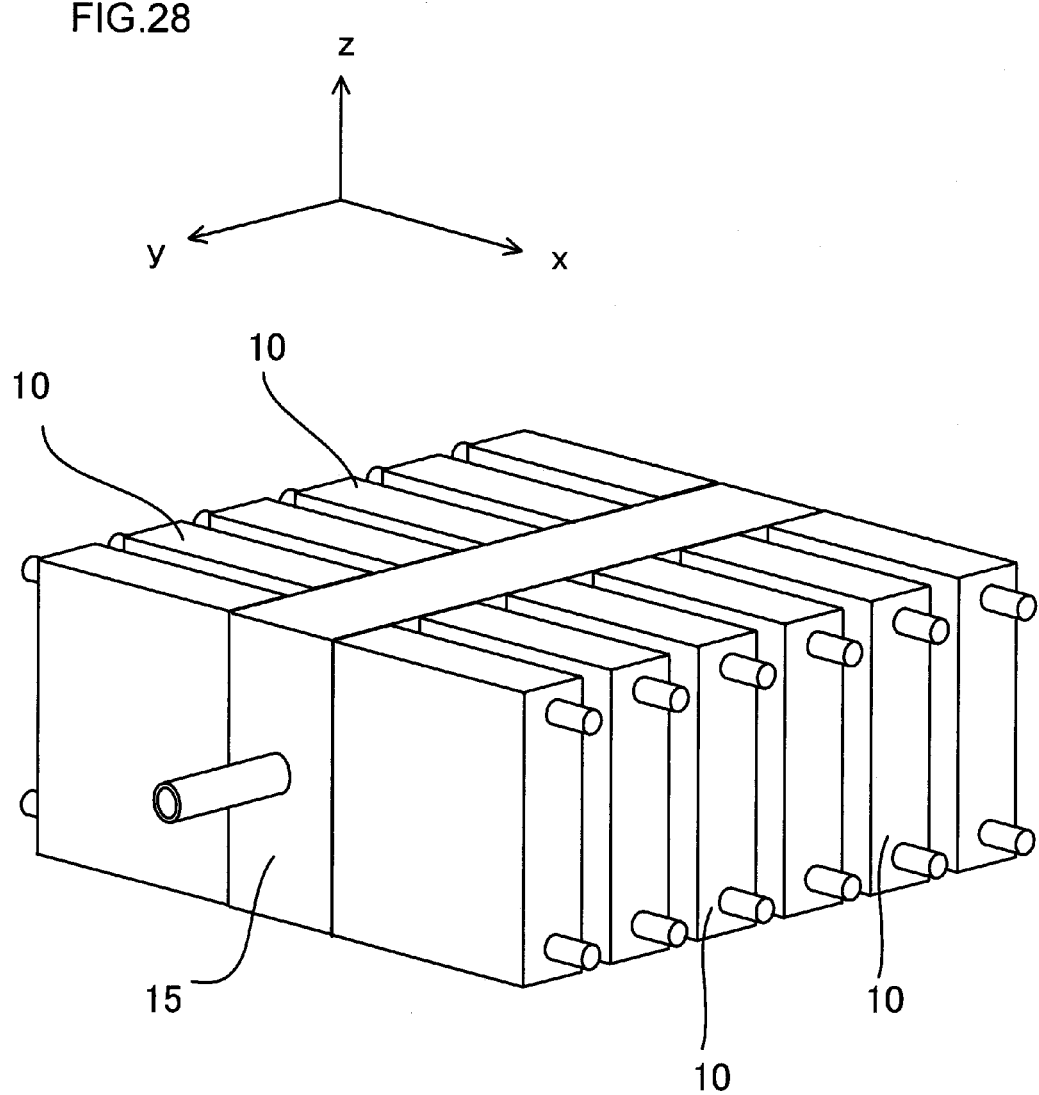
FIG. 28 shows a perspective of the mounting structure with which the cooling plate and the battery cells are mounted, adopted in the battery module according to embodiment 7 of the present invention.

FIG. 28 shows the electric storage module according to embodiment 7 of the present invention in a perspective of the connecting structure with which a cooling plate 15 and battery cells 10 are thermally connected with each other.

In embodiment 7, the battery cells 10 are disposed so that their positive electrode output portions 108 and negative electrode output portions 107 are set on the opposing sides along the height of the cooling plate 15. In other words, the battery cells 10 are disposed with an orientation achieved by rotating the battery cells oriented as in embodiment 1 by 90°.

The plurality of battery cells 10 in this electric storage module are set side-by-side along the length of the cooling plate 15. The positional arrangement allows the cooling plate 15 to assume a smaller dimension along the y (lengthwise) direction, since the dimension of each battery cell 10 along the y (lengthwise) direction is smaller. In addition, since the battery cells 10 are disposed side-by-side along the y direction running along the length of the cooling plate 15, heat exchange occurs at even positions for all the battery cells 10 relative to the passage of the coolant flowing through the cooling plate 15 and thus, hardly any inconsistency manifests with regard to the cooling of the individual battery cells 10.

The structure achieved in embodiment 7 may or may not include thermally conductive members 16. The thermally conductive members 16 may be incorporated in the structure achieved in embodiment 7 in conjunction with battery cell mounting plates 17 such as those shown in FIG. 10 or in conjunction with recessed portions, such as those shown in FIGS. 19 through 21, formed at the cooling plate 15. In addition, the structure achieved in the embodiment 7 may be adopted in conjunction with a cooling plate 15 assuming any of the structures described in reference to embodiments 4 through 6.

—Embodiment 8—

The electric storage modules achieved in embodiments 1 through 7 include battery cells 10 constituted with prismatic secondary battery cells. The battery module achieved in embodiment 8 is unique in that it includes cylindrical secondary battery cells.

Figure 29:
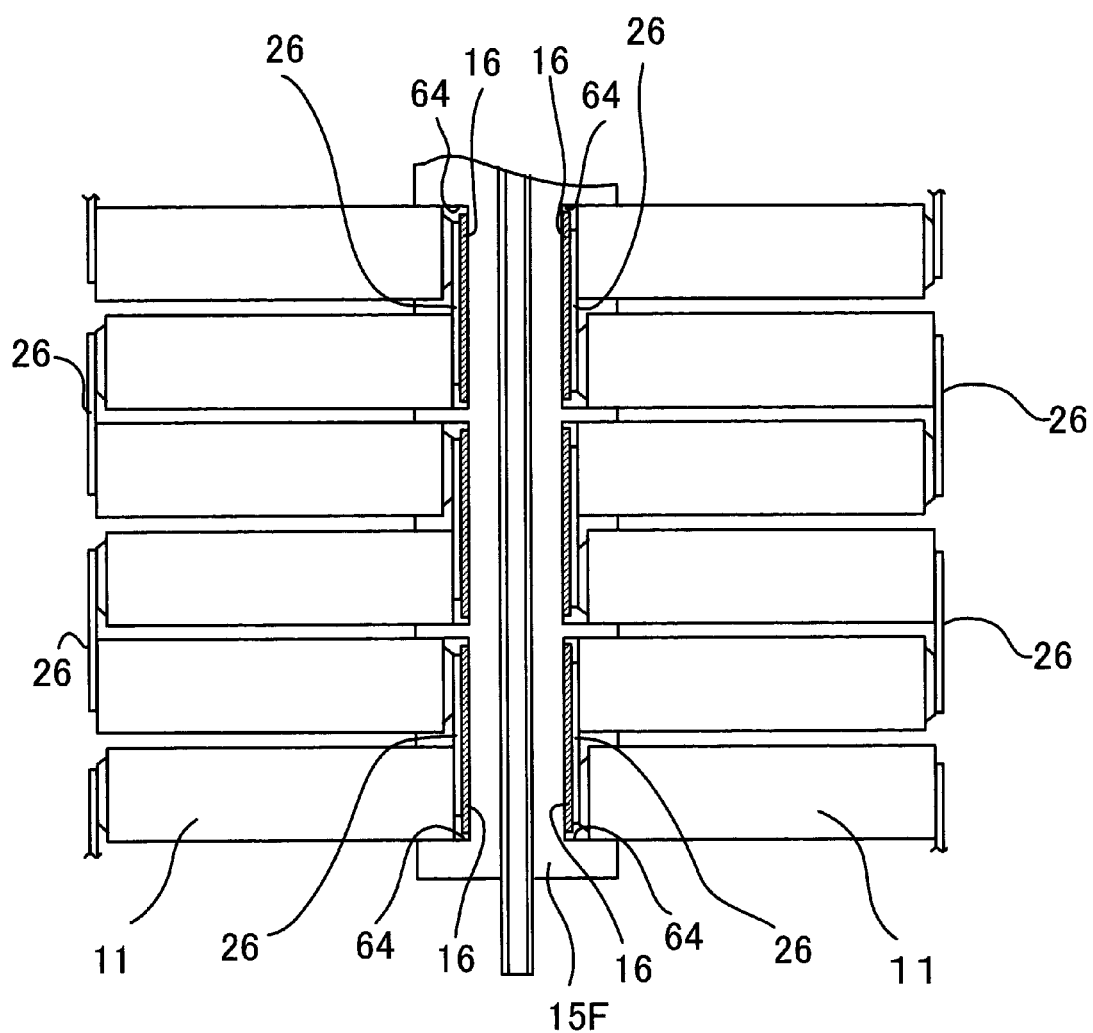
FIG. 29 is a perspective showing the structure adopted in the battery module according to embodiment 8 of the present invention to connect the cooling plate and the battery cells so as to achieve thermal conduction.

FIG. 29 is a plan view showing the connecting structure with which cylindrical battery cells 11 and a cooling plate 15F are connected so as to achieve thermal conduction.

On the front surface side and the rear surface side of the cooling plate 15F, a plurality of recessed portions 64 are formed. The depth of the recessed portions 64 is large enough to house the front ends of the cylindrical battery cells 11, whereas the length of the recessed portions 64 along the length of the cooling plate 15F is large enough to house a pair of cylindrical battery cells 11.

A thermally conductive member 16 is attached to the bottom surface of each recessed portion 64. The cylindrical battery cells 11 in each pair are positioned so that their positive electrode terminal/negative electrode terminal (the bottom of the battery case) orientations are reversed, with the positive electrode terminal of one of the cylindrical battery cells 11 and the bottom of the battery case of the other cylindrical battery cell 11 making up the pair connected via a bus bar 26. The bus bar 26 connecting the positive electrode terminal of one cylindrical battery cell 11 with the bottom of the battery case of the other cylindrical battery cell 11 as described above is pressed onto the outer surface of the thermally conductive member 16.

The positive electrode terminal of the other cylindrical battery cell 11 in the pair, located on the side opposite from the cooling plate 15F, is connected with the bottom of the battery case of the cylindrical battery cell in the adjacent pair via a bus bar 26. This connecting structure allows all the cylindrical battery cells 11 disposed on the front surface side or the rear surface side of the cooling plate 15F to be connected in series.

While FIG. 29 shows a single stage of cylindrical battery cells 11, a plurality of stages of cylindrical battery cells 11 are disposed, as in embodiment 1.

The thermally conductive members 16 used in conjunction with a cooling plate 15F constituted of an electrically conductive material need to be formed by using a material with an insulating property. However, the thermally conductive members 16 used in conjunction with a cooling plate 15F constituted of a nonconductive material can be formed by using a conductive material.

The electric storage module achieved in embodiment 8 featuring cylindrical battery cells 11 includes a plurality of cylindrical battery cells 11 disposed both on the front surface side and on the rear surface side of the cooling plate 15F so as to assure improved cooling efficiency and enable overall miniaturization.

Since the cylindrical battery cells 11 are stacked over a plurality of stages, a further improvement in the cooling efficiency is achieved. Since the cylindrical battery cells 11 are thermally coupled with the cooling plate 15F via the thermally conductive members 16, the cylindrical battery cells 11 do not become short-circuited with one another even if condensation develops at the cooling plate 15F.

It is to be noted that although not shown, the cylindrical battery cells 11 may be pressed against the thermally conductive members 16 via clips 30, as in embodiment 1 or via fastening members such as the stud bolts 6 and the nuts 24 used in embodiment 2. In addition, the cooling plate 15F may adopt any of the structures described in reference to embodiments 4 through 6.

The battery modules achieved in the various embodiments of the present invention as described above each include a plurality of prismatic battery cells 10 or cylindrical cells 11 disposed both on the front surface side and on the rear surface side of the cooling plate 15 and thus assure better cooling efficiency and enable overall miniaturization.

It is to be noted that while the battery cells 10 in the embodiments described above are constituted with lithium ion secondary battery cells, the electric storage module and the electric storage device according to the present invention may be achieved by using another type of secondary battery cells, such as nickel-metal hydride battery cells or nickel cadmium battery cells, instead of lithium battery cells.

Moreover, the battery cell module according to the present invention allows for numerous variations without departing from the scope of the invention, as long as it includes a cooling plate with a front surface and a rear surface thereof created by assuming a specific thickness and a coolant flowing inside the cooling plate allowing the front surface and the rear surface thereof to function as cooling surfaces, a first battery row made up with a plurality of battery cells, to be cooled by the cooling plate, arrayed along a predetermined direction, with end surfaces of the battery cells located on one side connected with the front surface of the cooling plate so as to achieve thermal conduction, and a second battery row made up with a plurality of battery cells, to be cooled by the cooling plate, arrayed along a predetermined direction, with end surfaces of the battery cells located on one side connected with the rear surface of the cooling plate so as to achieve thermal conduction.

In addition, structural details of the electric storage device according to the present invention is not limited to those described earlier, as long as the electric storage device includes a plurality of electric storage modules structured as described above and the cooling plates of the individual electric storage modules are linked with one another so as to achieve a branched flow of the coolant.

The electric storage modules according to the above embodiments and variations, which include a first battery row made up with battery cells connected to one another so as to achieve thermal conduction disposed at the front surface of a cooling plate, and a second battery row made up with battery cells connected with one another so as to achieve thermal conduction, disposed at the rear surface of the cooling plate, improve the volumetric efficiency for cooling and can be provided as a compact unit.

The above described embodiments are examples, and various modifications can be made without departing from the scope of the invention.

What is claimed is:

1. An electric storage module, comprising:
a cooling plate with a predetermined thickness between a front surface and a rear surface, with the front surface and the rear surface functioning as cooling surfaces by a coolant flowing in the cooling plate, the cooling plate being disposed so that the front surface and the rear surface are substantially perpendicular to a mounting surface;
a first battery row made up with a plurality of prismatic battery cells coupled with the front surface of the cooling plate so as to achieve thermal conduction and to be cooled by the cooling plate, wherein in the first battery row the plurality of battery cells are disposed over a plurality of stages stacked along a direction perpendicular to the mounting surface and arrayed along the cooling plate with battery case bottom surfaces of the battery cells facing the front surface of the cooling plate;
a second battery row made up with a plurality of prismatic battery cells coupled with the rear surface of the cooling plate so as to achieve thermal conduction and to be cooled by the cooling plate, wherein in the second battery row the plurality of battery cells are disposed over a plurality of stages stacked along the direction perpendicular to the mounting surface and arrayed along the cooling plate with battery case bottom surfaces of the battery cells facing the rear surface of the cooling plate;
a pair of end plates that cover the first battery row and the second battery row, one of the end plates being disposed at one side of the direction along which the battery cells are stacked and another of the end plates being disposed at another side of the direction along which the battery cells are stacked;
a first terminal cover disposed at a side of the first battery row opposite from the cooling plate;
a second terminal cover disposed at a side of the second battery row opposite from the cooling plate;
a first locking device that locks, via the pair of end plates, the battery cells of the first battery row and the battery cells of the second battery row with the cooling plate; and
a second locking device that presses the battery cells of the first battery row toward the front surface of the cooling plate via the first terminal cover and presses the battery cells of the second battery row toward the rear surface of the cooling plate via the second terminal cover.

2. An electric storage module according to claim 1, further comprising:
cell separator plates disposed between the stacked battery cells.

3. An electric storage module according to claim 1, wherein:
the first locking device comprises a fastening member; and
the second locking device comprises elastic members that lock the end plates with the first terminal cover and with the second terminal cover.

4. An electric storage module according to claim 1, wherein:
the first locking device includes a fastening member that also functions as the second locking device that presses the battery cells of the first battery row toward the front surface of the cooling plate via the first terminal cover and presses the battery cells of the second battery row toward the rear surface of the cooling plate via the second terminal cover.

5. An electric storage module according to claim 1, wherein:
positive electrode terminals and negative electrode terminals of the battery cells are disposed at surfaces located on a side opposite from the battery case bottom surfaces of the battery cells.

6. An electric storage module according to claim 1, wherein:
a heat transfer member with a coefficient of thermal conductivity equal to or higher than 1 W/m·K is disposed between the front surface of the cooling plate and the battery case bottom surfaces of the battery cells and between the rear surface of the cooling plate and the battery case bottom surfaces of the battery cells.

7. An electric storage module according to claim 6, wherein:
the heat transfer member is constituted with one of a thermally conductive sheet, a thermally conductive gel and a thermally conductive adhesive.

8. An electric storage module according to claim 6, wherein:
insulating members with a predetermined thickness are disposed at the cooling plate so as to hold corners of the battery cells; and
the heat transfer member, compressed to a thickness corresponding to the thickness of the insulating members, is in contact with the front surface of the cooling plate and the battery case bottom surfaces of the battery cells and with the rear surface of the cooling plate and the battery case bottom surfaces of the battery cells.

9. An electric storage module according to claim 6, wherein:
- a recessed portion with a width smaller than a width of the battery case bottom surfaces of the battery cells is formed at both the front surface and the rear surface of the cooling plate; and
- the heat transfer member, placed within the recessed portion and compressed along a thickness-wise direction, is in contact with the front surface of the cooling plate and the battery case bottom surfaces of the battery cells and with the rear surface of the cooling plate and the battery case bottom surfaces of the battery cells.

10. An electric storage device comprising:
- a plurality of electric storage modules, each corresponding to the electric storage module according to claim 1, wherein:
- cooling plates of the electric storage modules are connected to one another via a piping so as to achieve a branched flow of coolant.

\* \* \* \* \*